United States Patent

Tanoue et al.

[11] Patent Number: 6,064,643
[45] Date of Patent: May 16, 2000

[54] OPTICAL RECORDING DISK HAVING LAND AND GROOVE CONTINUOUSLY ALTERNATED IN SPIRAL TRACKS

[75] Inventors: Koki Tanoue; Hideaki Osawa, both of Yokohama, Japan

[73] Assignee: Kabushiki Kaisha Toshiba, Kawasaki, Japan

[21] Appl. No.: 09/050,370

[22] Filed: Mar. 31, 1998

[30] Foreign Application Priority Data

Apr. 1, 1997 [JP] Japan ................................. 9-082725

[51] Int. Cl.[7] ....................................................... G11B 7/24
[52] U.S. Cl. ................................... 369/275.3; 369/275.4
[58] Field of Search ............................. 369/275.3, 275.4, 369/275.2, 44.26, 58

[56] References Cited

U.S. PATENT DOCUMENTS 5,724,338  3/1998  Birukawa et al. .................. 369/275.2
5,754,506  5/1998  Nagasawa et al. .................. 369/275.4
5,872,767  2/1999  Nagai et al. ......................... 369/275.3

*Primary Examiner*—Tan Dinh
*Attorney, Agent, or Firm*—Pillsbury Madison & Sutro LLP

[57] ABSTRACT

A first-half header portion constituted by a first header portion whose VFO portion as long repeated data is arranged at the start and a second header portion whose VFO portion as short repeated data is arranged at the start is used as the header portion of each of land sectors arranged in a predetermined number along a spiral track. A second-half header portion constituted by a third header portion whose VFO portion as long repeated data is arranged at the start and a fourth header portion whose VFO portion as short repeated data is arranged at the start is used as the header portion of each of groove sectors arranged in a predetermined number along a spiral track. These land and groove sectors are continuously alternated in units of spiral tracks.

6 Claims, 8 Drawing Sheets

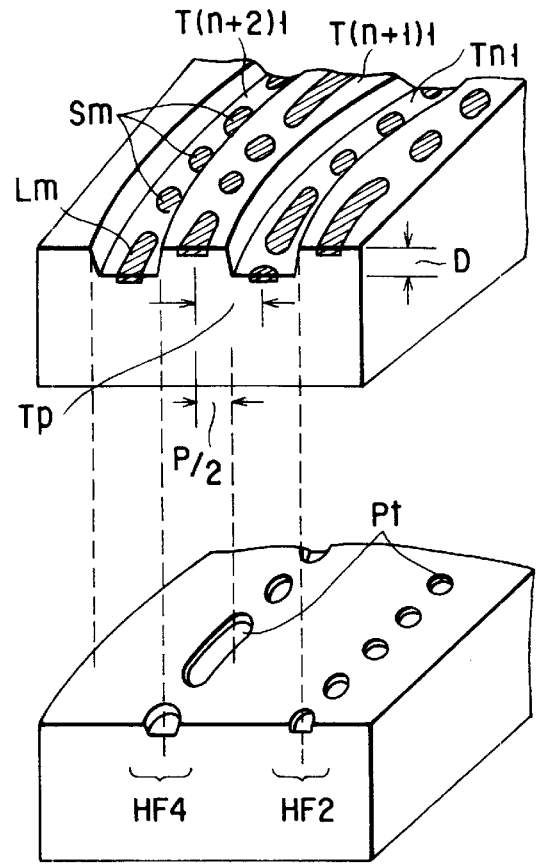
FIG. 3A
FIG. 3B
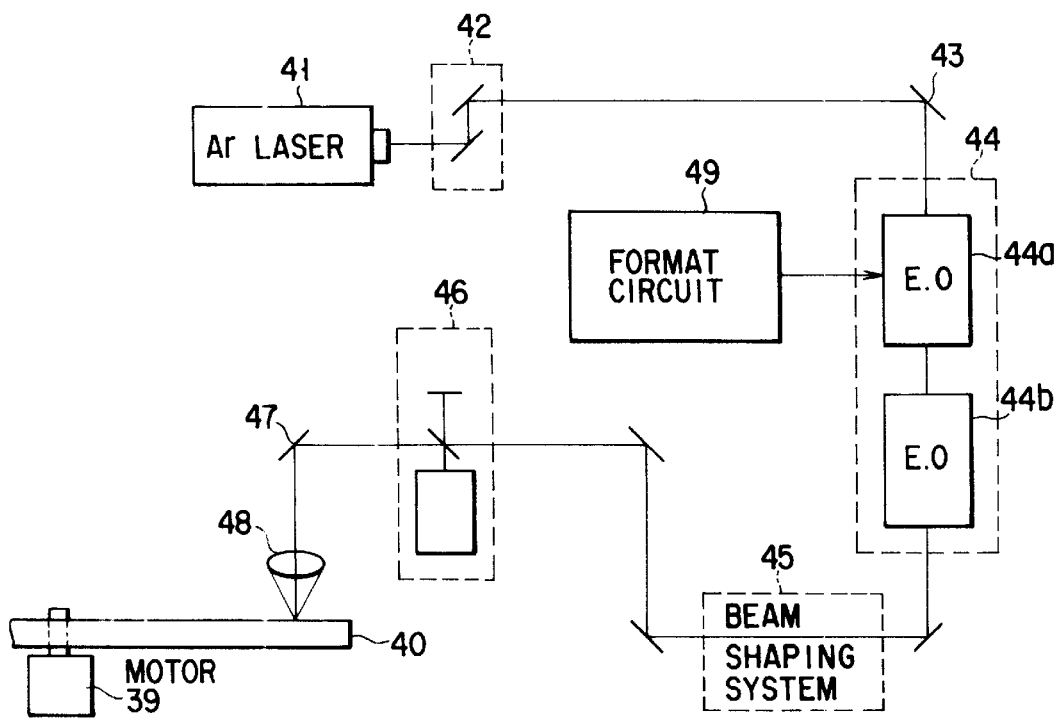
FIG. 5

FIG. 6A

| HEADER FIELD | MIRROR FIELD | GAP FIELD | GUARD 1 FIELD | VFO 3 FIELD | PS FIELD | DATA FIELD | PA3 FIELD | GUARD 2 FIELD | BUFFER FIELD |
|---|---|---|---|---|---|---|---|---|---|
| | | | | RECORDING FIELD | | | | | |
| 128 | 2 | 10−J/16 | 20−K | 35 | 3 | 2418 | 1 | 55−K | 25−J/16 |

| HEADER 1 FIELD | | | | | HEADER 2 FIELD | | | | | HEADER 3 FIELD | | | | | HEADER 4 FIELD | | | | |
|---|---|---|---|---|---|---|---|---|---|---|---|---|---|---|---|---|---|---|---|
| VFO1 | AM | PID1 | IED1 | PA1 | VFO2 | AM | PID2 | IED2 | PA2 | VFO | AM | PID3 | IED3 | PA1 | VFO2 | AM | PID4 | IED4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

OPTICAL RECORDING DISK HAVING LAND AND GROOVE CONTINUOUSLY ALTERNATED IN SPIRAL TRACKS

BACKGROUND OF THE INVENTION

The present invention relates to an information recording/reproducing optical disk which allows to record/reproduce information in units of sectors arranged along a spiral track, and a method of forming the same.

Examples of so-called rewritable optical disks allowing information recording/reproduction, which are already commercially available, are a 120-mm magneto-optical disk, 90-mm magneto-optical disk, and a 120-mm phase change disk (so-called PD).

These disks have guide grooves for guiding laser beam radiation, and tracking is performed using diffraction of a laser beam due to the guide grooves. The guide groove is formed continuously and spirally from the inner peripheral portion to the outer peripheral portion of the disk. This guide groove portion is called a groove, and the remaining portion is called a land. In the conventional optical disk, information is recorded only on one of the groove and land.

Information on such an optical disk is read/written in units of 512 or 2,048 bytes. This information unit is called a sector. Each sector has a sector address representing the address of the sector and is formatted in accordance with a predetermined sector format to record information on a target sector and reliably reproduce the information. Sector address information is recorded by forming recesses called pits at the start of the sector in formatting. The portion where the sector address information is recorded is called a header. In the conventional optical disk, information is recorded only on one of the groove and land, as described above. For this reason, the header is also formed only on the groove in groove recording or only on the land in land recording.

In the conventional optical disk, information is recorded only in one of the groove and land. However, it is readily expected that a larger recording capacity can be realized by recording information on both the land and groove.

However, to record information on both the land and groove, the method of forming sector addresses poses a problem. This problem will be described below.

In the conventional optical disk having a spiral groove, the groove is parallel to the land. The groove and land form spiral loci parallel to each other. Such a conventional optical disk structure will be referred to as a double spiral structure hereinafter.

In this double spiral structure, the groove and land are parallel, so movement from the groove to the land always requires a track jump. When information recording/reproduction is switched from the groove to the land (or from the land to the groove), a track jump or seek is required, so continuous information recording/reproduction is difficult.

In addition, when the disk having the double spiral structure is to be formatted, sectors on the groove (to be referred to as groove sectors hereinafter) and sectors on the land (to be referred to as land sectors hereinafter) must be independently formatted. This is disadvantageous in formatting the disk such that information can be alternately recorded/reproduced on/from the land and groove adjacent to each other by a zone CAV (constant angular velocity) scheme.

More specifically, to form continuous sector addresses on the land and groove adjacent to the land, only the groove or only the land must be formatted while assigning intermittent addresses in units of tracks. In this case, it is difficult to format the disk such that the address positions match at the connection portion where the addresses are continuously assigned from the land to the groove or from the groove to the land. In addition, if movement from the land to the groove or from the groove to the land in recording/reproducing information is not smooth, a wait for disk rotation occurs, so continuous information recording/reproduction is inhibited.

The present invention has been made to solve the above problems, and has as its object to provide an information recording/reproducing optical disk and a method for forming the same having a large recording capacity and allowing continuous information recording/reproduction with high reliability.

BRIEF SUMMARY OF THE INVENTION

In order to achieve the above object, according to the present invention, there is provided an information recording/reproducing optical disk wherein a predetermined number of land sectors are arranged along one spiral track, each land sector having a first recording portion as a land-shaped area arranged on the spiral track to record/reproduce information, and a first-half header portion comprising a first header portion representing address information of the information to be recorded/reproduced on/from the first recording portion and having a start portion as a continuously repeated data pattern with a first length, and a second header portion arranged subsequent to the first header portion, representing the same address information as that represented by the first header portion, and having a start portion as a continuously repeated data pattern with a second length smaller than the first length, and arranged prior to the first recording portion; a predetermined number of groove sectors are arranged along one spiral track subsequent to the predetermined number of land sectors arranged along the spiral track, each groove sector having a second recording portion as a groove-shaped area arranged on the spiral track to record/reproduce information, and a second-half header portion comprising a third header portion representing address information of the information to be recorded/reproduced on/from the second recording portion and having a start portion as a continuously repeated data pattern with a third length, and a fourth header portion arranged subsequent to the third header portion, representing the same address information as that represented by the third header portion, and having a start portion as a continuously repeated data pattern with a fourth length smaller than the third length, and arranged prior to the first recording portion while being paired and staggered with the first-half header portion; and a predetermined number of land sectors are arranged along one spiral track subsequent to the predetermined number of groove sectors arranged along one spiral track, so that the land sectors and the groove sectors are continuously alternated in units of spiral tracks.

More specifically, the first-half header portion comprises a first header portion representing address information of the information to be recorded/reproduced on/from the first recording portion and having a start portion as a continuously repeated data pattern with a first length, and a second header portion arranged subsequent to the first header portion at the same track position as that of the first header portion, representing the same address information as that represented by the first header portion, and having a start portion as a continuously repeated data pattern with a second length smaller than the first length, and is arranged prior to the first recording portion at a track position displaced from a track position of the first recording portion in a radial direction of the optical disk by the first length, i.e., at a track position displaced from the track position of the first recording portion outward in the radial direction of the optical disk by a distance ½ a track pitch of the spiral track.

The second-half header portion comprises a third header portion representing address information of the information to be recorded/reproduced on/from the second recording portion and having a start portion as a continuously repeated data pattern with a third length, and a fourth header portion arranged subsequent to the third header portion at the same track position as that of the third header portion, representing the same address information as that represented by the third header portion, and having a start portion as a continuously repeated data pattern with a fourth length smaller than the third length, and is arranged prior to the first recording portion at a track position displaced from a track position of the second recording portion in the radial direction of the optical disk by the second length, i.e., at a track position displaced from the track position of the second recording portion inward in the radial direction of the optical disk by the distance ½ the track pitch of the spiral track while being staggered with the first-half header portion.

The data pattern of each of the first to fourth header portions is used to cause an optical disk device for recording/reproducing information on/from the optical disk to generate a synchronous signal to be synchronized with the information to be reproduced from the optical disk. The data pattern of each of the first and third header portions has a length of 36 bytes, for example, and the data pattern of each of the second and fourth header portions has a length of 8 bytes, for example.

According to the present invention, there is also provided a method of forming an information recording/reproducing optical disk, characterized by comprising the steps of forming only a predetermined number of first recording portions of the land sectors continuously along one spiral track without forming the first-half header portions of the land sectors, after only the predetermined number of first recording portions are continuously formed along the spiral track, forming a predetermined number of second recording portions of the groove sectors continuously along one spiral track while forming the second-half header portions of the groove sectors and the first-half header portions of the land sectors which represent address information with a one-track difference from that represented by the second-half header portions, i.e., while forming the first-half header portions of the land sectors, which represent address information with a one-track difference outward from that represented by the second-half header portions, so that the first-half header portions, the second-half header portions, and the second recording portions are continuously formed along one spiral track, and after the predetermined number of second recording portions are formed along one spiral track together with the first-half header portions and the second-half header portions, forming only a predetermined number of first recording portions continuously along one spiral track without forming the first-half header portions of the land sectors so that the land sectors and the groove sectors are alternated in units of spiral tracks.

In the information recording/reproducing optical disk having the above arrangement formed by this method according to the present invention, the first-half header portion representing the address information of information to be recorded/reproduced on/from the first recording portion is read prior to recording/reproduction of information on/from the first recording portion of the land sector.

In addition, the second-half header portion representing the address information of information to be recorded/reproduced on/from the second recording portion is read prior to recording/reproduction of information on/from the second recording portion of the groove sector. Since both the land sector and the groove sector are used to record/reproduce information, large-capacity information can be recorded.

Information recording/reproduction on/from the land sector and information recording/reproduction on/from the groove sector are continuously alternately performed in units of spiral tracks because the land sectors and groove sectors are alternated in units of tracks. With this arrangement, any track jump or seek need not be performed to switch between the land sector and the groove sector in units of spiral tracks in recording/reproducing information, so continuous high-speed information recording/reproduction is enabled.

In the first-half header portion constituted by the first header portion and the second header portion in the land sector, the start portion of the first header portion has a continuously repeated data pattern longer than the start portion of the second header portion following the first header portion. In the second-half header portion constituted by the third header portion and the fourth header portion in the groove sector as well, the start portion of the third header portion has a continuously repeated data pattern longer than the start portion of the fourth header portion following the third header portion.

That is, at the start portion of the land sector and at the start portion of the groove sector, the synchronous signal to be synchronized with information reproduced from the optical disk is generated from the optical disk device on the basis of the relatively long continuously repeated data pattern. Therefore, the synchronous signal can be reliably generated, and the first-half header portion of the land sector and the second-half header portion of the groove sector can be detected with high reliability, so more reliable information recording/reproduction is enabled.

Especially, for the land sector, when the information recording/reproducing optical disk of the present invention is formed by the above-described method, the first recording portion is formed while having a one-track difference from the first-half header portion representing the address information of information recorded on the first recording portion, so the desired position of the first recording portion may be shifted from that of the first-half header portion. However, even when the shift is generated, the synchronous signal can be reliably generated, and the first-half header portion of the land sector can be detected with high reliability because the start portion of the first header portion of the land sector has the continuously repeated data pattern longer than the start portion of the second header portion. Therefore, more reliably information recording/reproduction is enabled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a track format of the information recording/ reproduction optical disk according to the present invention;

FIGS. 3A and 3B are enlarged perspective views showing recording portions of the land/groove structure and a header portion of a pit structure;

FIG. 5 is a block diagram showing a master recording apparatus for recording a recessed pattern corresponding to grooves or pits on a master by cutting in manufacturing the information recording/reproducing optical disk according to the embodiment of the present invention;

FIG. 6A is a view showing the entire structure of a sector in the information recording/reproducing optical disk according to the embodiment of the present invention;

FIG. 6B is a view showing details of the header portion of the sector shown in FIG. 6A;

DETAILED DESCRIPTION OF THE INVENTION

The embodiment of the present invention will be described below with reference to the accompanying drawings.

Figure 1:
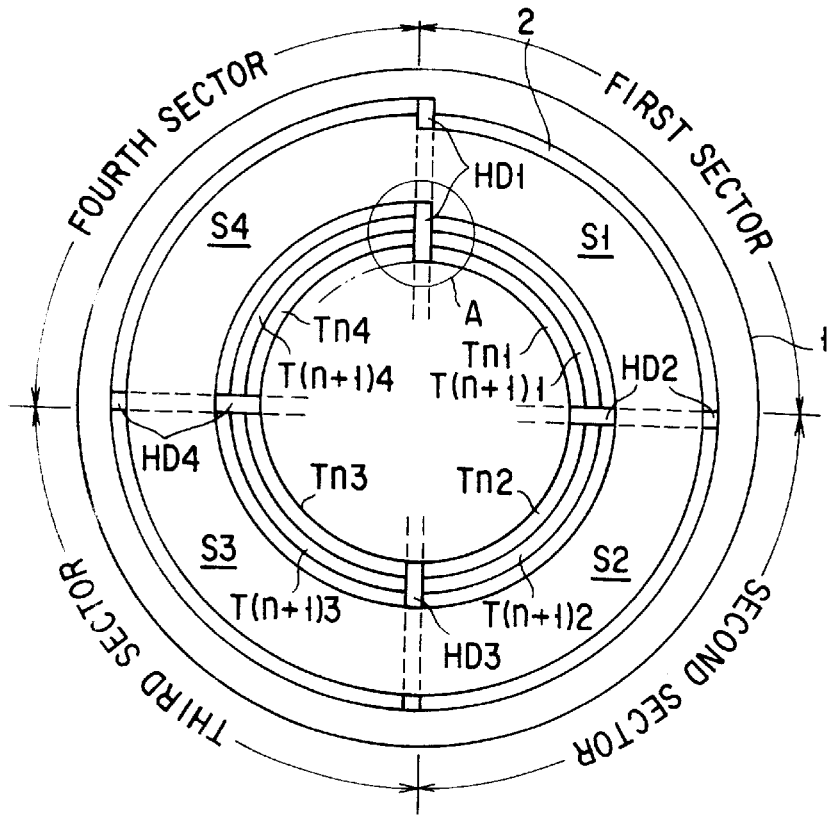

FIG. 1 is a schematic view showing a track format of an information recording/reproduction optical disk 1 according to one embodiment of the present invention. The optical disk 1 has a spiral track 2 which is divided into a plurality of (four, in this case) sector regions S1 to S4. Sector tracks included in each sector region are provided with header regions HD1 to HD4 each including a header structure as will be described in detail later.

The track 2 includes a plurality of land tracks and groove tracks. Each land track is arranged along one spiral track and each groove track is arranged along one spiral track. The land tracks and the groove tracks are connected at the header region HD1 so that the land tracks and groove tracks are alternately arranged on the optical disk 1 from the inner peripheral side to the outer peripheral side thereof to form the single track 2.

In FIG. 1, a projected band shaped portion is referred to as the land track portion and a recessed band shaped portion is referred to as the groove portion. When the optical disk 1 is used to record/reproduce information to/from the optical disk 1, a light beam is applied from the back side of the drawing. Therefore, the land track is seen as a groove track and the groove track is seen as a land track from the view point of the light beam application.

In FIG. 1, a groove track Tn1 of an n-th sector included in the first sector region S1 is connected to a groove track Tn2 via a header portion of the header region HD2 in the second sector region S2 and then connected to a groove track Tn3 via the header portion of the header region HD3 in the third sector region S3 and at last is connected to a groove track Tn4 via a header portion of the header region HD4 in the fourth sector region S4.

The groove track Tn4 is connected to a (n+1)-th land track T(n+1)1 via a header portion of the header region HD1 in the first sector region S1 and in the similar way, to land tracks T(n+1)2, T(n+1)3, T(n+1)4, respectively in sequence, via header portions of the header regions HD2 to HD4.

Figure 2:
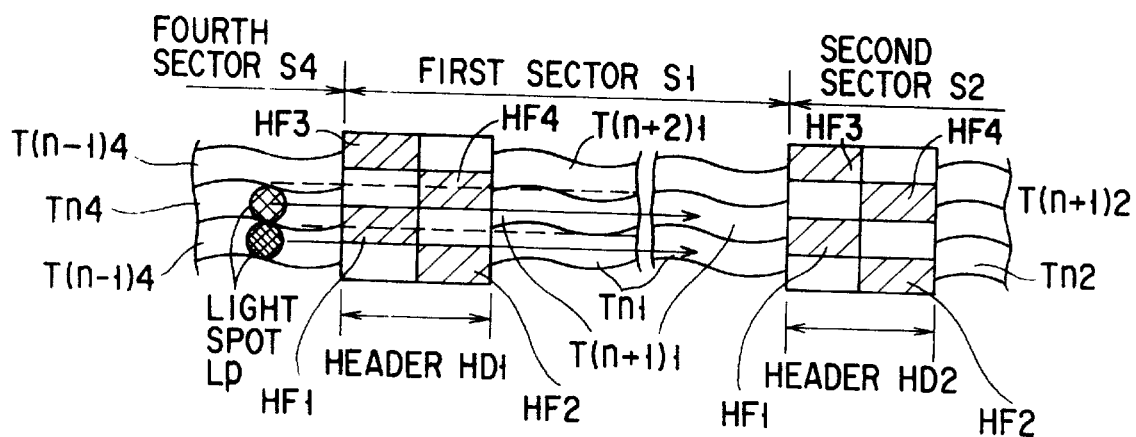
FIG. 2 is an enlarged view showing a header portion enclosed by a circle A shown in FIG. 1.

The connection between the land tracks and the groove tracks at the header region HD1 enclosed in an circle A shown in FIG. 1 will be described in detail by referring to FIG. 2. In FIG. 2, track headers HF1 and HF2 are provided for connecting a land track T(n−1)4 and a groove track Tn1 in the header region HD1 of the first sector region S1. The track header HF1 is formed in a track position displaced from the track position of the land track T(n−4)4 by a distance ½ a track width pitch outward in a radial direction of the optical disk 1, while the track header HF2 is displaced from the track position of the groove track Tn1 by a distance ½ a width pitch inward in the radial direction of the disk 1. Accordingly, the track headers HF1 and HF2 are displaced with each other by the width pitch of the groove track Tn1 in the radial direction of the disk 1 so that the headers HF1 and HF2 are arranged in a so-called staggered fashion with each other.

In the header region HD2, the relative positional relationships among the headers HF1, HF2 and the groove tracks Tn1, Tn2 are the same as those in the header region HD1. The n-th groove track Tn1 is connected to the groove track Tn2 via the staggered track headers HF1 and HF2 of the header region HD2 in the second sector region S2. As has been described by referring to FIG. 1, the groove track Tn2 is connected to the groove tracks Tn3 and Tn4 in sequence and the groove track Tn4 of the fourth sector region S4 is connected to the next track header HF1 of the next land track T(n+1)1 in the header region HD1. Thus, the track header HF1 is commonly connected to the two tracks T(n−1)4 and Tn4 in a manner displaced by the distance ½ the track pitch of the respective tracks T(n−1)4 and Tn4 as will be described in detail later.

The track header HF1 is connected to the track header HF4 staggered with the track header HF1 in a manner displaced by a track pitch from the track header HF1. To the track header HF4 is connected a land track T(n+1)1 in a manner displaced from the track of the header HF4 by ½ the track pitch inward in the radial direction of the disk 1. The land track T(n+1)1 is connected to a land track T(n+1)2 via the staggered track headers HF1 and HF4. In the similar manner, a land track T(n+1)4 is connected to the track header HF3 in the header region HD1 displaced from the track of the header HF3 by ½ the track pitch inward direction of the disk 1.

This track header HF3 is displaced from the track header HF4 by the track pitch P in the outward direction to arrange the track headers HF1 to HF4 in a staggered fashion. The track header HF4 is connected is connected to a groove track T(n+2)1 displaced from the header HF4 by ½ the track pitch in the outward direction of the disk 1.

The land track T(n−1)4 is connected to the groove track Tn1, the groove track Tn4 to the land track T(n+1)1, and the land track T(n+1)4 to the groove track T(n+2)1 via the headers in the header region HD1. Whereas, in the remaining header regions HD2 to HD4, the land tracks are connected to the land tracks and the groove tracks are connected to the groove tracks. Accordingly, when the groove tracks are arranged along one spiral track, the last groove track is connected to a first one of the land tracks, and the land tracks arranged along one spiral track are followed by the next groove tracks, thereby forming one spiral track from inner peripheral side to the outer peripheral side of the optical disk 1.

When information is being recorded/reproduced on/from the optical disk 1, a laser light spot Lp is scanned by an arrow as shown in FIG. 2. The light spot Lp having a diameter substantially equal to the track width, for example, is scanned along the land track T(n−)4 and enters into the header region HD1. In this header region HD1, the outer half portion of the light spot Lp is first scans the inner half portion of the first header portion HF1 and then the outer half of the second header portion HF2 is scanned by the inner half part of the light spot Lp. When the light spot Lp enters from the groove track Tn4 to the header region HD1, the light spot Lp scans the outer half part of the first header portion HF1 and then the inner half part of the fourth header portion HF4 and enters into the land track T(n+1)1. Address information to be recorded in the tracks in the first sector region S1 is recorded in the header portions HF1 to HF4 in advance and reproduced when the header portions HF1 to HF4 are scanned by the light spot Lp in the described manner. Recording/reproduction of the address information will be described in detail later.

The track portions used to record/reproduce information is formed by the alternately arranged land tracks and groove tracks wherein the information is recorded in the form of a phase change recording mark in the present embodiment. However, a rewritable optical disk allowing information recording/reproduction also can be realized as a magneto-optical disk, according to the present invention.

The header regions HD1 to HD4 have a structure wherein recesses called as pits are formed on a flat surface of the header forming area of the optical disk 1. The structure of the land tracks and groove tracks formed with phase change recording marks and the header portions formed with pits will be described by referring to FIGS. 3A and 3B.

FIG. 3A is a perspective view for showing a part of information recording portion of the groove track Tn1, land track T(n+1)1 and groove track T(n+2)1 connected to the headers in the header region HD1. Hatched portions are the phase change recording marks including short marks Sm and long marks Lm which are combined in accordance with the contents of the information being recorded. In this embodiment, the depth D of the respective groove tracks is set as ⅙ the wavelength of the laser light. The wavelength is set as 680 nm and the track pitch Tp is set in the range of 0.65 to 0.80 micron. The diameter of the light spot Lp is set about 0.95 micron. The diameter of the width of the pit Pt is set in the order of 0.7 micron in FIGS. 3A and 3B.

FIG. 3B is a perspective view showing a part of the track headers HF2 and HF4 connected to the groove track Tn1, land track T(n+1)1 and groove track T(n+2)1 in the header region HD1. As has been described above, the header region HD1 has no land/groove structure unlike the track portions.

In the flat surface of the header region a plurality of recesses or pits Pt are arranged in the direction of the tracks as shown in FIG. 3B. The dashed lines connecting the boundary portions of the land and groove tracks shown in FIG. 3A and the center of the pits Pt shown in FIG. 3B show the fact that the header portions HF2 and HF4 are displaced from the land and groove tracks by a distance ½ the track pitch P. The depth of the pits Pt is set in the order of ¼ a wavelength of the laser light.

Figure 4A:
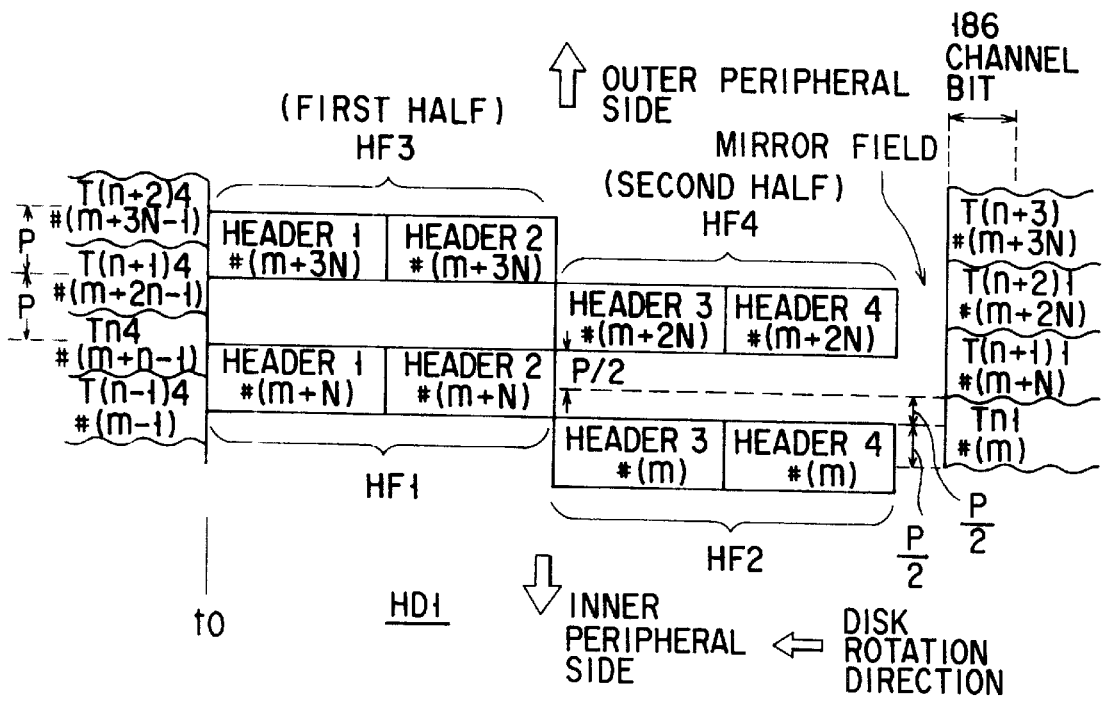
FIGS. 4A and 4B are detailed views showing the header structure in sectors of the information recording/ reproduction optical disk according to one embodiment of the present invention.
Figure 4B:
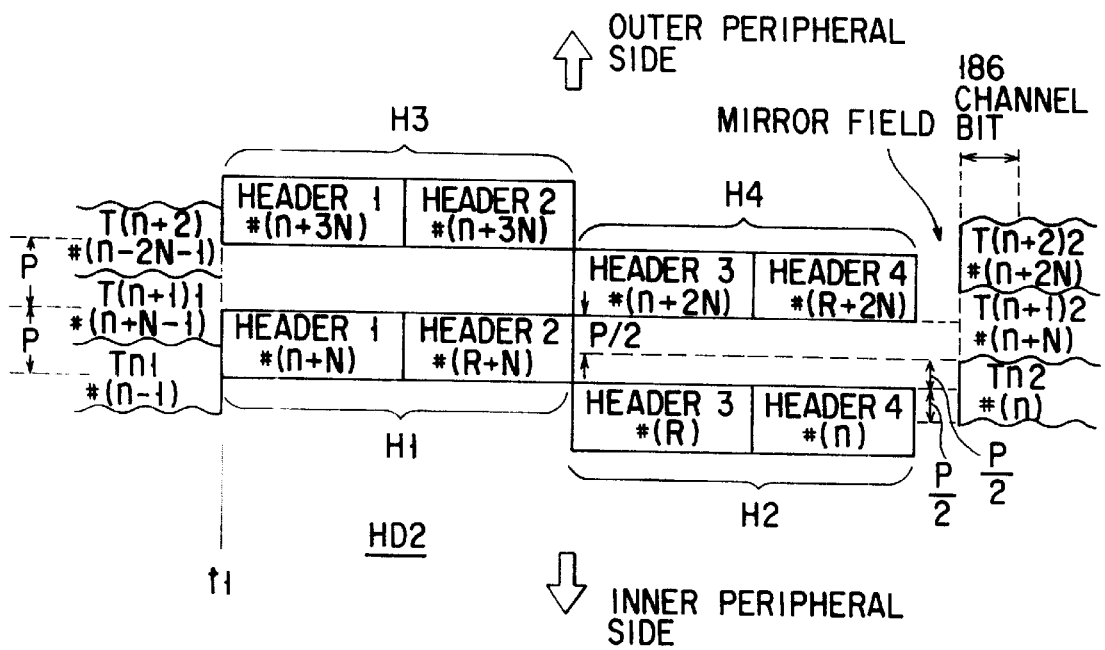

FIGS. 4A and 4B schematically show the arrangement of header portions HF1 to Hf4 of the header region HD1 in the sector region S1 of an information recording/reproducing optical disk 1 shown in FIGS. 1 to 3B. In the optical disk 1 having the header portion structure shown in FIG. 1, when the track 2 is spirally traced, the polarity of tracking is alternated at the header region HD1 in units of one spiral track between the land and groove without any track jump. This structure will be described below.

FIG. 4A shows the arrangement of the header portions of the first sector S1 at the tracking polarity switching portion, namely, at the header region HD1 as shown in FIG. 2. The sector at the tracking polarity switching portion will be called first sector S1. FIG. 4B shows the arrangement of the header portions HD2 to HD4 of sectors S2 to S4 other than the first sector S1. In the above-described scheme of alternating the groove and land in units of tracks, the polarity representing the groove or land must be switched in tracking, and the correspondence between the tracks and header portions at the tracking polarity switching sector S1 is different from that of the remaining sectors S2 to S4.

In FIG. 4A, each of track headers HF1 and HF3 is provided with serially arranged header portions header-1 and header-2 and each of track headers HF2 and HF4 is provided with serially arranged header portions header-3 and header-4 to form the first header region HD1. The header region HD1 is an area formed by a recessed pattern called pits Pt as shown in FIG. 3B. Address information associated with the first sector S1 is recorded by this pits Pt.

Tracks Tn1, T(n+1)1, T(n+2)1 and T(n+3)1 are information recording areas included in the sector region S1, and tracks T(n−1)4, Tn4, T(n+1)4 and T(n+2)4 are information recording areas included in the fourth sector S4. These information recording areas are formed from, e.g., a phase change recording film and will be referred to as recording portions hereinafter. In the phase change recording film, the user records/reproduces information using the difference in reflectance between the crystalline state and amorphous state of the recording film due to a change in optical characteristics.

The tracks Tn2, T(n+1)2 and T(n+2)2 in the second sector region S2 shown in FIG. 4B are also information recording regions of the phase change type recording films.

Of the recording tracks, tracks Tn1, T(n+2)1, Tn4 and T(n+2)2 are groove tracks and the tracks Tn2, T(n+2)2 in FIG. 4B are also groove tracks. These track regions will be referred to as a recording portion in a groove sector.

On the other hand, tracks T(n+1)1, T(n+3)1, T(n−1)4 and T(n+1)4 are recording portions of sectors which are adjacent to the groove sectors and formed at portions other than the guide grooves, and will be referred to as recording portions of land sectors hereinafter.

In FIGS. 4A and 4B, the upper side of the drawing corresponds to the outer peripheral portion of the disk 1, and the lower side corresponds to the inner peripheral portion of the disk 1. Therefore, the vertical direction in FIGS. 4A and 4B corresponds to the radial direction of the disk 1.

In addition, reference characters #(m), #(m+N), #(m+2N), #(m+3N) and #(n), #(n+N), #(n+2N), #(n+3N) shown in FIGS. 4A and 4B are sector numbers representing sector addresses. In this case, m and n are integers, N is the number of sectors per one spiral track and a predetermined integer from, e.g., 17 to 40.

The header structure shown in FIG. 4A will be described below. FIG. 4A shows the header region HD1 in the first sector S1 corresponding to four tracks with sector numbers #m, #(m+N), #(m+2N), and #(m+3N). The header portions of this first header region HD1 are formed to have a quadruple write structure by cutting operations (to be described later). The header portions having the quadruple write structure are those header-1, header-2, header-3, and header-4.

Header portions header-1 and header-2 constitute first and third header portions HF1 and HF3 of the first-half header portion, and header-3 and header-4 constitute second and fourth header portions of a second-half header portion. The first-half header portion is used as the land sector header portion, and the second-half header portion is used as the groove sector header portion.

More specifically, in the recording portion Tn1 of groove sector #(m) whose address is represented by sector number #(m), a second-half header portion HF2 formed at the start portion via a mirror field (to be referred to as a mirror portion hereinafter) is used as the header portion of the sector. No information is recorded/reproduced to/from this mirror portion. The second-half header portion HF2 is constituted by header portions header-3 and header-4 on which the address information of sector number #(m) is recorded. The second-half header portion HF2 is formed at a position displaced inward from the position of the recording track Tn1 of groove sector #(m) by ½ the track pitch. The track pitch is the distance from the center of a land to the center of a groove adjacent to the land and corresponds to a distance P shown in FIGS. 4A and 4B.

For the recording track T(n+1)1 of land sector #(m+N) whose address information is represented by sector number #(m+N), a first-half header portion HF1 formed at the start portion via the mirror portion and the area occupied by the above-described second-half header portion HF2 is used as the header portion of the sector. The first-half header portion HF1 is constituted by the header portions header-1 and header-2 on which address information of sector number #(m+N) is recorded. More specifically, the first-half header portion HF1 represents address information different from that represented by the second-half header portion HF2 by one track, i.e., the first-half header portion HF1 represents address information different from that of the second-half header portion HF2 on an outside track. In addition, the first-half header portion HF1 is formed at a position shifted inward from the position of the recording portion T(n+1)1 of land sector #(m+N) by ½ the track pitch.

The recording portion T(n+1)1 of land sector #(m+N) is formed adjacent to the recording portion Tn1 of groove sector #(m). More specifically, the recording portion T(n+1)1 of land sector #(m+N) is formed at a position shifted outward from the recording portion Tn1 of groove sector #(m) by one track pitch. That is, the first-half header portion HF1 is formed at a position shifted outward from the second-half header portion HF2 by one track pitch. The first-half header portion HF1 and second-half header portion HF2 are continuously formed by cutting (to be described later), and header-2 of the first-half header portion HF1 and header-3 of the second-half header portion HF2 are close to each other. With this arrangement, the first-half header portion HF1 and second-half header portion HF2 are paired to have a staggered header structure.

The recording portion T(n−1)4 of land sector #(m−1) whose address information is represented by a sector number immediately preceding to sector number #(m) of the recording portion Tn1 of groove sector #(m) is formed on the same track as that of the recording portion Tn1 of groove sector #(m) via the area occupied by the first-half header portion HF1 which is formed between the recording portion T(N−1)4 and the start portion of the second-half header portion HF2 as the header portion of groove sector #(m), i.e., header-3. Similarly, the recording portion Tn4 of groove sector #(m+N−1) whose address information is represented by a sector number immediately preceding to sector number #(m+N) of the recording portion T(n+1)1 of land sector #(m+N) is formed on the same track as that of the recording portion RF2T(n+1)1 of land sector #(m+N) to be close to the start portion of the first-half header portion HF1 as the header portion of land sector #(m+N), i.e., header-1.

The header structure shown in FIG. 4B will be described next. In FIG. 4B, sectors corresponding to three tracks with sector numbers #n, #(n+N), and #(n+2N) are shown. The header portions of these sectors are formed to have a quadruple write structure by cutting (to be described later), as in the above-described first sectors. The header portions having the quadruple write structure will be referred to as header-1, header-2, header-3, and header-4, as in the first sectors. Header-1 and header-2 constitute first-half header portions H1 and H3 used as the header portion of the land sector, and header-3 and header-4 constitute second-half header portions H2 and H4 used as the header portion of the groove sector.

More specifically, for the recording portion Tn2 of groove sector #(n) whose address is represented by sector number #(n), a second-half header portion H2 formed at the start portion via a mirror portion is used as the header portion of the sector. The second-half header portion H2 is constituted by header-3 and header-4 on which the address information of sector number #(n) is recorded. The second-half header portion H2 is formed at a position displaced inward from the position of the recording portion Tn2 of groove sector #(n) by ½ the track pitch.

For the recording portion T(n+1)2 of land sector #(n+N) whose address information is represented by sector number #(n+N), a first-half header portion H1 formed at the start portion via the mirror portion and the area occupied by the above-described second-half header portion H2 is used as the header portion of the sector. The first-half header portion H1 is constituted by header-1 and header-2 in which the address information of sector number #(n+N) is recorded. The first-half header portion H1 is formed at a position displaced inward from the position of the recording portion T(n+1)2 of land sector #(n+N) by ½ the track pitch.

The recording portion T(n+1)2 of land sector #(n+N) is formed adjacent to the recording portion Tn2 of groove sector #(n). More specifically, the recording portion T(n+1)2 of land sector #(n+N) is formed at a position displaced outward from the recording portion Tn2 of groove sector #(n) by one track pitch. That is, the first-half header portion H1 is formed at a position displaced outward from the second-half header portion H2 by one track pitch. The first-half header portion H1 and second-half header portion H2 are continuously formed by cutting (to be described later), and header-2 of the first-half header portion H1 and header-3 of second-half header portion H2 are close to each other. With this arrangement, the first-half header portion H1 and second-half header portion H2 have a staggered header structure.

A sector whose address is represented by a sector number immediately preceding to sector number #(n) of the recording portion Tn2 of groove sector #(n) is groove sector #(n−1), unlike the above-described first sector. The recording portion Tn1 of groove sector #(n−1) is formed on the same track as that of the recording portion Tn2 of groove sector #(n) via the area occupied by the first-half header portion H1 which is formed between the recording portion Tn1 and the start portion of the second-half header portion H2 as the header portion of groove sector #(n).

Similarly, a sector whose address is represented by a sector number immediately preceding to sector number #(n+N) of the recording portion T(n+1)2 of land sector #(n+N) is land sector #(n+N−1). The recording portion T(n+1)1 of groove sector #(n+N−1) is formed on the same track as that of the recording portion T(n+1)2 of land sector #(n+N) to be close to the start portion of the first-half header portion H1 as the header portion of land sector #(n+N).

Manufacturing of the information recording/reproducing optical disk having the above arrangement will be described next by referring to FIG. 5 and FIGS. 8 to 10.

When an optical disk is to be manufactured, a master having a three-dimensional pattern corresponding to grooves or pits is formed first by a technique called cutting. The three-dimensional pattern formed on the master is transferred to a stamper. A resin to which the three-dimensional pattern is transferred using the stamper is formed. This resin is used as the substrate of an optical disk, and a recording film such as a phase change film is formed on the surface with the three-dimensional pattern by deposition or the like. A protective film for protecting the recording film is formed on the recording film by coating or the like. In this way, an optical disk having grooves and pits is manufactured. When optical disk substrates having the above structure are laminated via an intermediate layer consisting of the same material as that of the protective film, a laminated optical disk can be manufactured.

FIG. 5 shows a master recording apparatus for recording the three-dimensional pattern corresponding to the grooves and pits on the master by cutting.

In this master recording apparatus, a laser beam (e.g., an argon (Ar) laser or krypton (Kr) laser) emitted from a laser source 41 is incident on a laser optical axis control system 42 for adjusting the optical axis to cope with a variation in optical axis of the laser beam due to a change in temperature or the like. The laser beam is reflected by a mirror 43 and modulated into a laser beam having a given signal by a beam modulation system 44 having electro-optical effect (EO) modulators 44a and 44b controlled by a format circuit 49. At this time, the laser beam can be modulated into a predetermined format signal. The format circuit 49 controls the beam modulation system 44 to modulate the laser beam in accordance with the cutting operation (to be described later). Subsequently, the diameter or shape of the laser beam is adjusted through a beam shaping system 45 having a pin hole or slit. The laser beam is adjusted in this manner, and the beam shape can be confirmed by a beam monitoring system 46.

The laser beam is then guided by a mirror 47 and focused and irradiated on an optical recording master 40 through an objective lens 48. As the optical recording master 40, e.g., a glass disk is used. The glass disk is coated with a photosensitive material (photoresist), and the laser beam is irradiated on the surface of the photosensitive material. A portion exposed to the laser beam obtains a recessed portion upon etching. A desired three-dimensional pattern is formed on the surface by irradiating the laser beam, so the grooves and format pattern are recorded. A stamper is manufactured on the basis of the glass disk processed in the above manner.

In cutting, the glass disk 40 is rotated at a constant speed by a rotation means 39 such as an electric motor. In addition, an optical pickup having the objective lens 48, which irradiates the laser beam on a predetermined position of the glass disk 40, moves outward from the inside of the glass disk 40 at a predetermined speed. In cutting, the optical pickup performs uniform motion outward from the inside at a rate of one track pitch per revolution of the disk to move the laser irradiation position according to this movement. A portion irradiated with the laser beam by the optical pickup moving in this manner becomes a groove, and a portion not irradiated with the laser beam becomes a land. In the header portion, the three-dimensional pattern or recessed pattern corresponding to pits is formed by flickering the laser beam.

Figure 8:
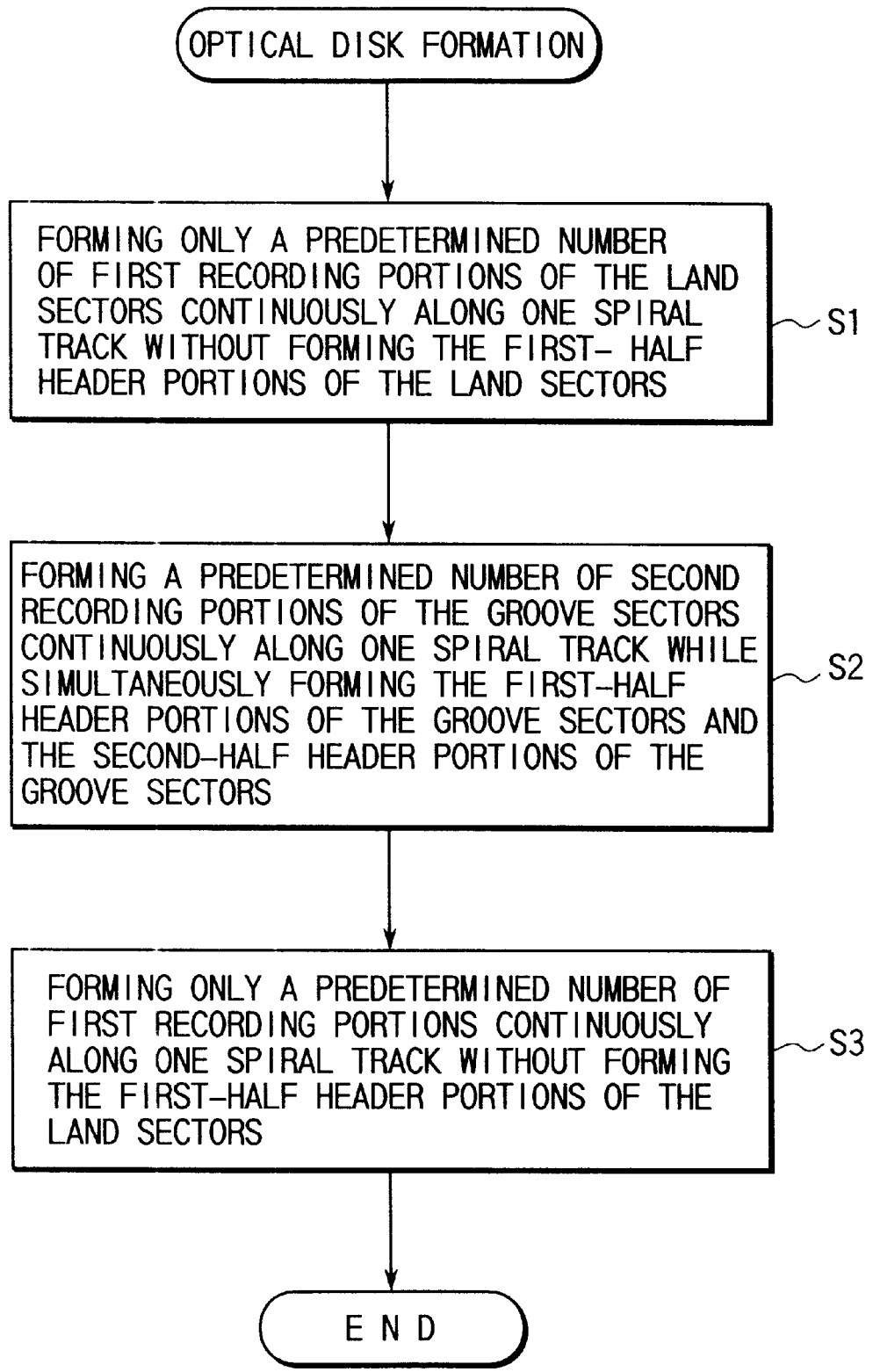
FIG. 8 is a flow chart showing a method of forming an information recording/reproducing optical disk according to the present invention.
Figure 9:
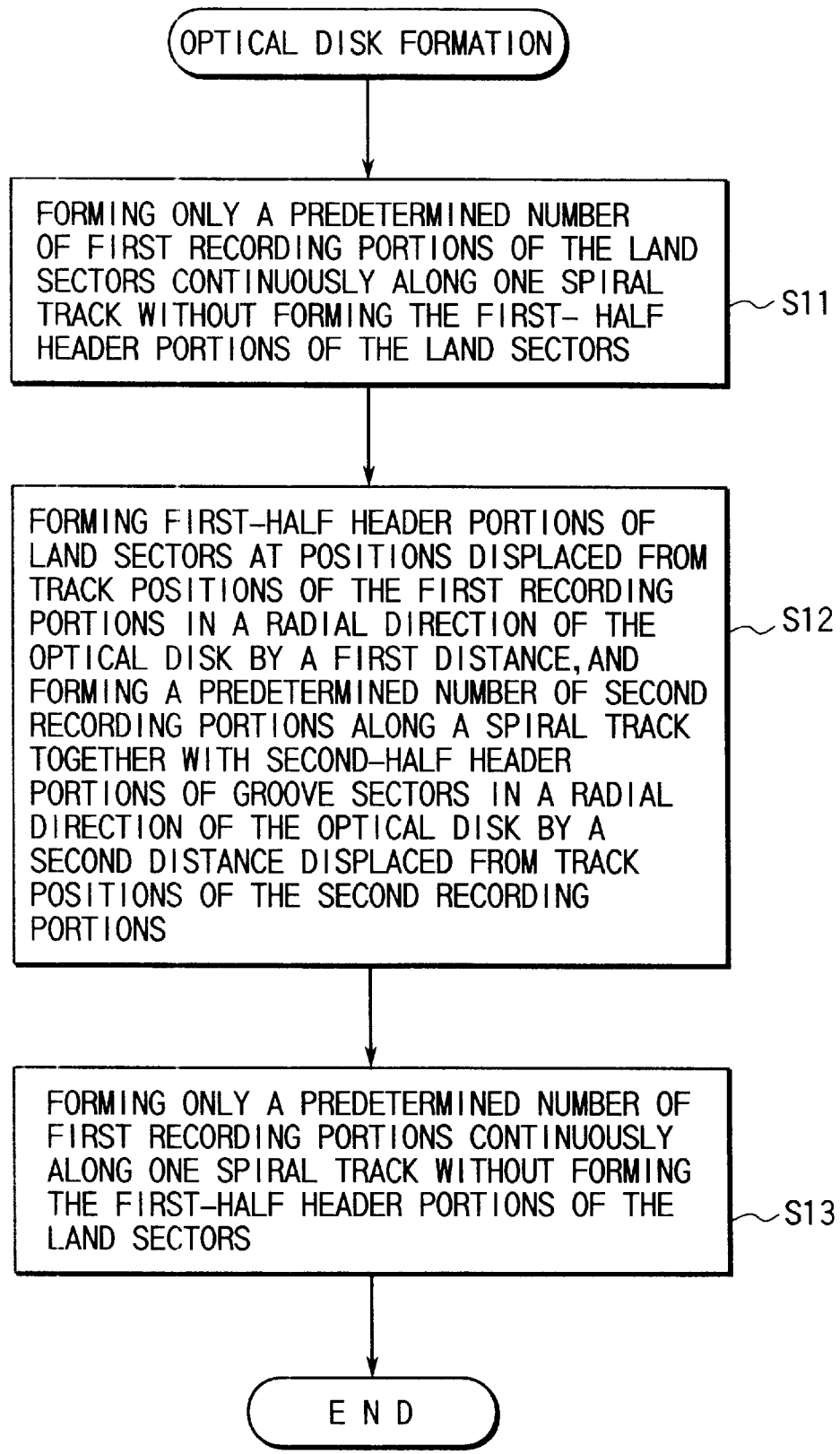
FIG. 9 is a flow chart showing in detail a method of forming an information recording/reproducing optical disk according to the present invention.
Figure 10:
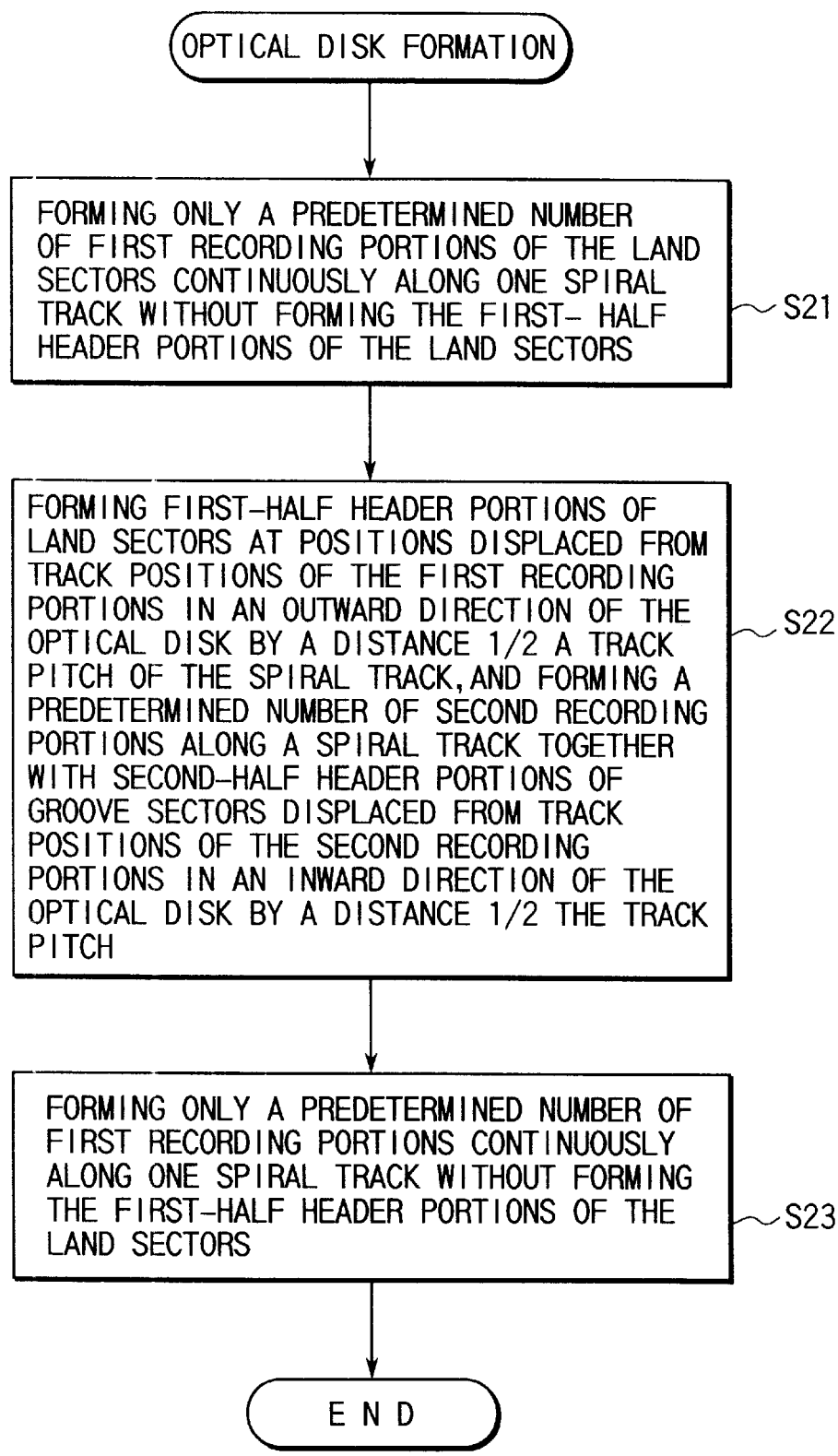
FIG. 10 is a flow chart showing in more detail a method of forming an information recording/reproducing optical disk according to the present invention.

The cutting operation in this embodiment will be described next with reference to FIGS. 4A and 4B as well as FIGS. 8 to 10.

In FIG. 4A, assume that cutting of the recording portion T(n−1)4 of land sector #(m−1) whose address is represented by sector number #(m−1) is ended at time t0. Note that in the land area such as the recording portion T(n−1)4 of land sector #(m−1), laser irradiation from the optical pickup is not performed, and only movement of the laser irradiation position is performed. This movement of the laser irradiation position is performed by moving the optical pickup and driving the objective lens provided in the optical pickup.

After processing of the recording portion T(n−1)4 of land sector #(m−1) is ended at time t0, the laser irradiation position is shifted outward from the track center of the recording portion T(n−1)4 of land sector #(m−1) by ½ the track pitch. Header-1 and header-2, i.e., the first-half header portion HF1 with sector number #(m+N), are recorded at this displaced or shifted track position. At this time, the laser beam irradiated from the optical pickup is flickered to form pits corresponding to information representing sector number #(m+N). Header-1 of the first-half header portion HF1 is recorded close to the recording portion T(n−1)4 of land sector #(m−1). After header-1 is recorded, header-2 of the first-half header portion HF1 is continuously recorded next to header-1.

When header-1 and header-2, i.e., the first-half header portion HF1 with sector number #(m+N), have been recorded by cutting, the laser irradiation position is moved inward from the track center of header-1 and header-2 by one track pitch. More specifically, the laser irradiation position is shifted inward from the track center of the recording portion T(n−1)4 of land sector #(m−1) by ½ the track pitch. Header-3 and header-4, i.e., the second-half header portion HF2 with sector number #(m), are recorded at the shifted track position. At this time, the laser beam irradiated from the optical pickup is flickered to form pits corresponding to information representing sector number #(m). Header-3 of the second-half header portion HF2 is recorded close to header-2 of the first-half header portion HF1. After header-3 is recorded, header-4 of the second-half header portion HF2 is continuously recorded next to header-3.

When header-3 and header-4, i.e., the second-half header portion HF2 with sector number #(m), have been recorded by cutting, the recording portion Tn1 of groove sector #(m)

is recorded via the mirror portion by cutting. At this time, the laser beam is not irradiated on the mirror portion. The laser irradiation position is moved outward from the track center of header-3 and header-4 with sector number #(m) by ½ the track pitch. More specifically, the laser irradiation position is shifted to the same position as the track center of the recording portion T(n−1)4 of land sector #(m−1), which is moved inward from the track center of header-1 and header-2 with sector number #(m+N) by ½ the track pitch.

The recording portion Tn1 of groove sector #(m) is recorded at this shifted track position by cutting. At the recording portion Tn1 of groove sector #(m), the laser beam is irradiated, and etching is performed using the photosensitive material to form a recessed portion, i.e., a groove. At this time, the spot of laser beam is sinusoidally oscillated outward from the inside, i.e., in the radial direction of the disk at a period of, e.g., 186 channel bits to form a waved groove. A signal component obtained from this waved groove can be used as a reference signal for clock generation in a data write (i.e., when information is to be recorded on the information recording/reproducing optical disk 1).

All sectors on one track from sector numbers #(m) to #(m+N−1) are groove sectors. In these groove sectors, cutting recording is performed following a predetermined procedure to be described below. Cutting for sectors other than first sectors will be described with reference to FIG. 4B.

In FIG. 4B, assume that cutting of the recording portion Tn1 of groove sector #(n−1) whose address is represented by sector number #(n−1) is ended at time t1. After processing of the recording portion Tn1 of groove sector #(n−1) is ended, the laser irradiation position is shifted outward from the track center of the recording portion Tn1 of groove sector #(n−1). Header-1 and header-2, i.e., the first-half header portion H1 with sector number #(n+N), are recorded at this shifted track position. At this time, the laser beam irradiated from the optical pickup is flickered to form pits corresponding to information representing sector number. Header1 of the first-half header portion H1 is recorded close to recording portion Tn1 of land sector #(n−1). After header-1 is recorded, header-2 of the first-half header portion H1 is continuously recorded next to header-1.

When header-1 and header-2, i.e., the first-half header portion H1 with sector number #(n+N), have been recorded by cutting, the laser irradiation position is moved inward from the track center of header-1 and header-2 by one track pitch. More specifically, the laser irradiation position is shifted inward from the track center of the recording portion Tn1 of groove sector #(n−1) by ½ the track pitch. Header-3 and header-4, i.e., the second-half header portion H2 with sector number #(n), are recorded at the shifted track position. At this time, the laser beam irradiated from the optical pickup is flickered to form pits corresponding to information representing sector number. Header-3 of the second-half header portion H2 is recorded close to header-2 of the first-half header portion H1. After header-3 is recorded, header-4 of the second-half header portion H2 is continuously recorded next to header-3.

When header-3 and header-4, i.e., the second-half header portion H2 with sector number #(n), have been recorded by cutting, the recording portion Tn2 of groove sector #(n) is recorded via the mirror portion by cutting. At this time, the laser beam is not irradiated on the mirror portion. The laser irradiation position is moved outward from the track center of header-3 and header-4 with sector number #(n) by ½ the track pitch. More specifically, the laser irradiation position is shifted to the same position as the track center of the recording portion Tn1 of land sector #(n−1), which is moved inward from the track center of header-1 and header-2 with sector number #(n+N) by ½ the track pitch.

The recording portion Tn2 of groove sector #(n) is recorded at this shifted track position by cutting. At the recording portion Tn2 of groove sector #(n), the laser beam is irradiated, and etching is performed using the photosensitive material to form a recessed portion, i.e., a groove. At this time, the spot of laser beam is sinusoidally oscillated outward from the inside, i.e., in the radial direction of the disk 1 at a period of, e.g., 186 channel bits to form a waved groove. A signal component obtained from this waved groove can be used as a reference signal for clock generation in a data write.

By repeating the same operation as the cutting operation from the groove sectors #(n−1) to #(n), cutting recording from the recording portion Tn1 of the groove sector with sector number #(m) to the recording portion Tn4 of the groove sector with sector number #(n+N−1) shown in FIG. 4A is performed.

After cutting recording from the recording portion Tn1 of groove sector #(m) to the recording portion Tn4 of groove sector #(n+N−1), cutting of the first sector shown in FIG. 4A is performed. At this time, the first sector is land sector #(m+N) next to groove sector #(m+N−1). All sectors on one track from sector numbers #(m+N) to #(m+2N−1) are land sectors. Therefore, no laser beam is emitted in cutting one track from land sector #(m+N) to land sector #(m+2N−1). The header portion of each land sector is formed at the time of cutting of the groove sector at a position shifted inward by one track.

After cutting from the land sector with sector number #(m+N) to the land sector with sector number #(m+2N−1) has been performed, cutting of a first sector is performed again. The first sector to be processed this time is groove sector #(m+2N) subsequent to land sector #(m+2N−1). Cutting of sectors from this groove sector #(m+2N) is performed by the same operation as that for sectors from groove sector #(m). By repeating this operation, sectors having the header structure shown in FIG. 4A, 4B are formed.

When the above-described recording is performed by cutting, the header portion of a groove sector, i.e., the second-half header portion constituted by header-3 and header-4 and the recording portion of a groove sector with the same sector number as that of this header portion are continuously recorded by cutting.

For example, the second-half header portion HF2 constituted by header-3 and header-4 with sector number #(m) and the recording portion Tn1 of groove sector #(m) are continuously cut.

However, the header portion of a land sector, i.e., the first-half header portion constituted by header-1 and header-2 and the recording portion of a land sector with the same sector number as that of this header portion are not continuously recorded by cutting but recorded at positions shifted by one track. For example, the first-half header portion HF1 constituted by header-1 and header-2 with sector number #(m+N) and the recording portion T(n+1)1 of land sector #(m+N) are recorded at positions shifted by one track. If the disk rotation period is different from the recording signal period for N sectors, the header portion of a land sector is recorded by cutting while being shifted from the recording portion of a land sector whose sector number is indicated by the header portion.

A sector format according to the embodiment of the present invention, which allows reliable header portion detection even when information is to be recorded/reproduced in/from an optical disk 1 on which a header portion is recorded by cutting with a shift, will be described next.

FIG. 6A shows the entire structure of a sector according to the embodiment of the present invention. FIG. 6B shows details of the header portion of the sector.

In FIG. 6A, the sector consists of a total of 2,697 bytes: "Header field" (to be referred to as a header portion hereinafter) of 128 bytes, "Mirror field" (to be referred to as a mirror portion hereinafter) of 2 bytes, and "Recording field" (to be referred to as a recording portion hereinafter) of 2,567 bytes. These header portion, mirror portion, and recording portion are the same as those described above with reference to FIGS. 4A and 4B.

The header portion and the mirror portion have already been recorded as three-dimensional patterns before shipment of the optical disk. The operation of recording a three-dimensional pattern according to a predetermined format on the optical disk in advance before shipment is called preformatting.

At the recording portion, information which is identified on the basis of address information indicated by the corresponding header portion is to be recorded according to a predetermined format by the user of the optical disk after shipment of the optical disk. In the preformatted state, only a groove or land as an area where information is to be recorded is formed at this recording portion.

To record information on this recording portion of, e.g., a phase change optical disk, a laser beam modulated in correspondence with information to be recorded is irradiated on the phase change recording film formed on the recording portion to form crystalline and amorphous areas on the recording film. The user reproduces the information using the difference in reflectance between the crystalline state and amorphous state of the recording film at the recording portion due to a change in optical characteristics.

Information is recorded on this recording portion in accordance with a format constituted by a gap portion (Gap field) of (10+J/16) bytes, a guard 1 portion (Guard1 field) of (20+K) bytes, a VFO3 portion (VFO3 field) of 35 bytes, a presync portion (PS field) of 3 bytes, a data portion (Data field) of 2,418 bytes, a PA3 portion (PS3 field) of 1 byte, a Guard2 portion (Guard2 field) of (55−K) bytes, and a buffer portion (Buffer field) of (25−J/16) bytes. J is an integer from 0 to 15, and K is an integer from 0 to 7. Both take random values.

FIG. 6B shows the contents of a header portion based on the sector format of the optical disk according to the embodiment of the present invention. The header portion shown in FIG. 6B is constituted by header-1 field, header-2 field, header-3 field, and header-4 field. These fields are the same as those described above with reference to FIGS. 4A and 4B. These fields will be referred to as header-1, header-2, header-3, and header-4 hereinafter. Note that header-1 has a length of 46 bytes, header-2 has a length of 18 bytes, header-3 has a length of 46 bytes, and header-4 has a length of 18 bytes, i.e., the header portion has a total length of 128 bytes, for example.

Each of header-1, header-2, header-3, and header-4 is constituted by a VFO portion, an AM portion, a PID portion, an IED portion, and a PA portion. This arrangement will be described below.

The VFO (Voltage Frequency Oscillator) portion is a pull-in area for PLL (Phase Locked Loop). More specifically, this VFO portion is formed from a continuously repeated data pattern for causing a PLL circuit in an optical disk device (to be described later) to extract a synchronous signal (clock signal) which is used for a data read or optical disk rotational speed control in synchronism with information read and reproduced from the optical disk by the optical disk device for recording/reproducing information in/from the optical disk 1. This data pattern is continuously repeated to completely pull in synchronization by being locked with the PLL. When the PLL is locked with the data pattern, and synchronization is completely pulled in to generate a clock signal, the code pattern of the VFO also varies according to a change in rotation of the optical disk. For this reason, reliable data read or disk rotation control can be realized.

The VFO portion has a length of 36 bytes in header-1 or header-3 as VFO1 or has a length of 8 bytes in header-2 or header-4 as VFO2. More specifically, a first-half header portion is formed from header-1 and header-2 and used as the header portion of a land sector. The VFO portion of header-1 as the start portion of the first-half header portion is longer than that of header-2 on which a laser beam is irradiated subsequent to header-1. Similarly, a second-half header portion is formed from header-3 and header-4 and used as the header portion of a groove sector. The VFO portion of header-3 as the start portion of the second-half header portion is longer than that of header-4 on which the laser beam is irradiated subsequent to header-3. Normally, the PLL can be pulled in by setting the length of the VFO portion of each sector to at least 8 bytes.

When the VFO portion of header-1 or header-3 corresponding to the start portion of each sector is made longer than that of header-2 or header-4 which is not the start portion, the PLL can be more properly pulled in by the VFO portion. Therefore, the header portion of each sector can be more reliably detected, and information can be more reliably recorded/reproduced.

When information is to be recorded/reproduced in/from the optical disk on which the header portion of a land sector is recorded by cutting with a shift, the long VFO portion of header-1 as the start portion of a land sector is particularly effective.

More specifically, for a land sector, cutting of the header portion and cutting of the recording portion of a land sector whose sector number is indicated by the header portion have a time lag corresponding to one spiral track. If the disk rotation period and the recording signal period for N sectors are different, the header portion of the land sector is recorded by cutting while being shifted from the recording portion of the land sector whose sector number is indicated by the header portion. If a deviation is present between the header portion and the recording portion, header portion detection becomes harder than in the normal state. If an offset or the like is generated for tracking in addition to the deviation of header portion, the quality of a reproduced signal at the header portion of the land sector may be different from that at the recording portion of the land sector whose sector number is indicated by the header portion. This also makes header portion detection more difficult than in the normal state.

However, even in such a case, since the VFO portion of header-1 at the start portion of the land sector is long, the PLL can be reliably pulled in. The header detection accuracy increases, so the header portion can be properly and reliably detected.

The AM (Address Mark) is a synchronous code having a length of 3 bytes and is used to determine the word boundary in demodulation. The PID (Physical ID) is constituted by 1-byte long sector information and a 3-byte long sector number. The IED (ID Error Detection code) is a code for detecting an error in the 4-byte PID and has a length of 2 bytes. The PA (Post Amble) is a code necessary for setting the state of preceding bytes in demodulation and has a length of 1 byte.

Reading of the emboss or recessed portion of the information recording/reproducing optical disk having the above-described header structure, i.e., the header portion constituted by three-dimensional pits in information recording/reproduction will be described next.

Figure 7:
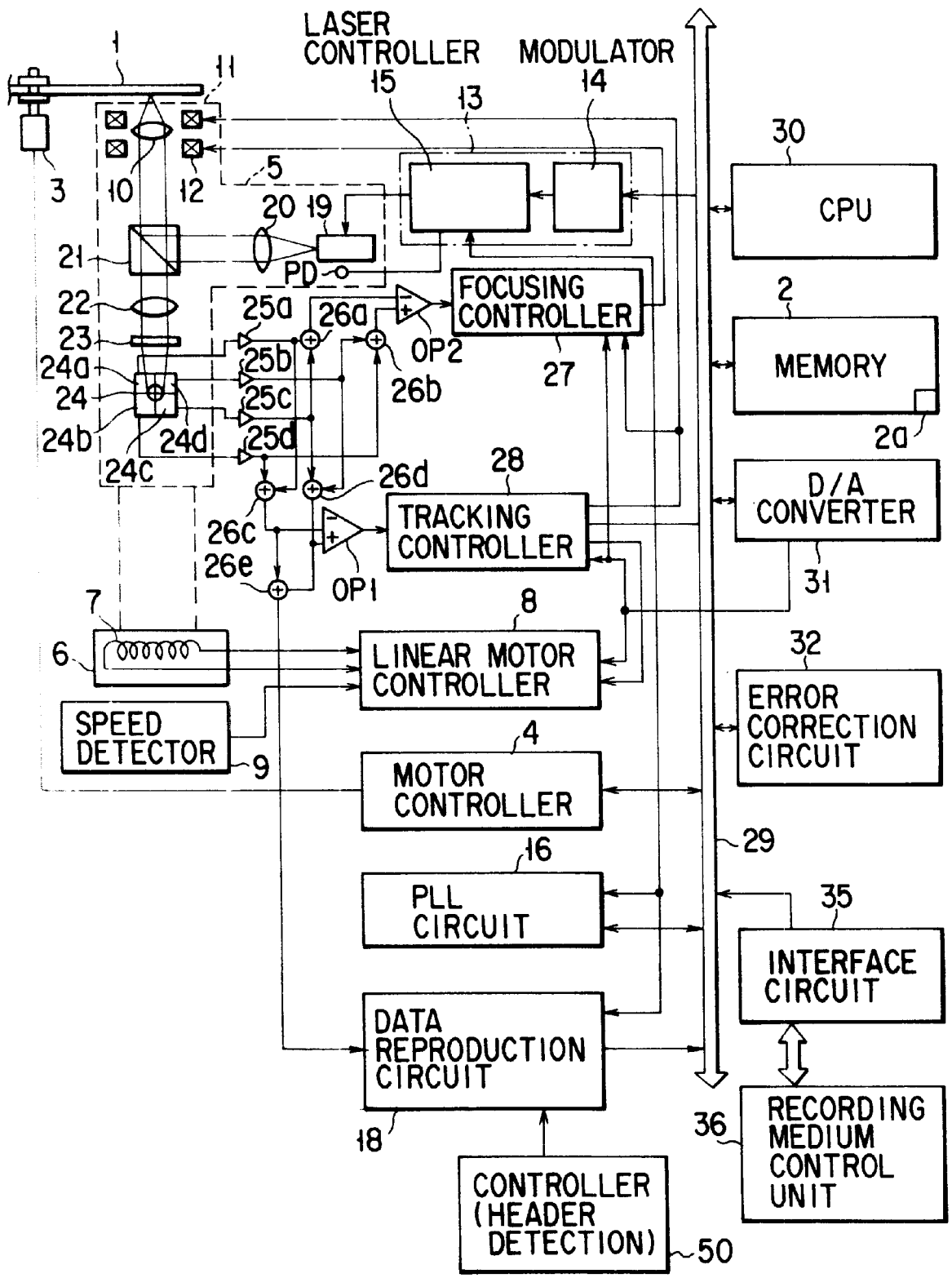
FIG. 7 is a block diagram showing the entire arrangement of an optical disk device for recording/reproducing information in/from the information recording/reproducing optical disk according to the embodiment of the present invention.

FIG. 7 is a block diagram showing the entire arrangement of the optical disk device for recording/reproducing information in/from the information recording/reproducing optical disk 1.

Referring to FIG. 7, the information recording/reproduction optical disk 1 as a disk-like information storage medium is rotated by a motor 3 at, e.g., a predetermined linear speed. The motor 3 is controlled by a motor controller 4. Information is recorded/reproduced in/from the optical disk 1 by an optical pickup 5. The optical pickup 5 is fixed to a driving coil 7 constituting the movable portion of a linear motor 6. The driving coil 7 is connected to a linear motor controller 8.

The linear motor controller 8 is connected to a speed detector 9, so the speed signal of the optical pickup 5 detected by the speed detector 9 is sent to the linear motor controller 8. A permanent magnet (not shown) is arranged at the stationary portion of the linear motor 6. When the driving coil 7 is excited by the linear motor controller 8, the optical pickup 5 is moved in the radial direction of the optical disk 1.

An objective lens 10 supported by a wire or leaf spring (not shown) is arranged in the optical pickup 5. The objective lens 10 can be moved along the focusing direction (direction of optical axis of the lens) by a driving coil 11 and can also be moved along the tracking direction (direction perpendicular to the optical axis of the lens) by a driving coil 12.

A laser beam is emitted from a semiconductor laser oscillator 19 under the control of a laser controller 13. The laser controller 13 comprises a modulator 14 and a laser driving circuit 15 and operates in synchronism with a recording clock signal supplied from a PLL circuit 16. The modulator 14 modulates recording data supplied from an error correction circuit 32 into a signal suitable for recording, e.g., 8–16 modulated data. The laser driving circuit 15 drives the semiconductor laser oscillator (or an argon-neon laser oscillator) 19 in accordance with the 8–16 modulated data from the modulator 14.

In recording, the PLL circuit 16 divides the frequency of the fundamental clock signal generated from a quartz oscillator into a frequency corresponding to the recording position on the optical disk 1, thereby generating a recording clock signal. In reproduction, the PLL circuit 16 generates a reproduction clock signal corresponding to a reproduced synchronous code and detects the frequency error of the reproduction clock signal. This frequency error detection is performed on the basis of whether the frequency of the reproduction clock signal is within a predetermined frequency range corresponding to the recording position of the data to be reproduced from the optical disk 1. The PLL circuit 16 also selectively outputs the recording or reproduction clock signal in accordance with a control signal from a CPU 30 and a signal from a binary circuit in a data reproduction circuit 18.

The laser beam emitted from the semiconductor laser oscillator 19 is irradiated on the optical disk 1 through a collimator lens 20, a half prism 21, and the objective lens 10. The reflected light from the optical disk 1 is guided to a photodetector 24 through the objective lens 10, the half prism 21, a condenser lens 22, and a cylindrical lens 23.

The photodetector 24 is divided into four photodetecting cells 24a to 24d. The output signal from the photodetecting cell 24a is supplied to one terminal of an adder 26a through an amplifier 25a. The output signal from the photodetecting cell 24b is supplied to one terminal of an adder 26b through an amplifier 25b. The output signal from the photodetecting cell 24c is supplied to the other terminal of the adder 26a through an amplifier 25c. The output signal from the photodetecting cell 24d is supplied to the other terminal of the adder 26b through an amplifier 25d.

The output signal from the photodetecting cell 24a is also supplied to one terminal of an adder 26c through the amplifier 25a. The output signal from the photodetecting cell 24b is also supplied to one terminal of an adder 26d through the amplifier 25b. The output signal from the photodetecting cell 24c is also supplied to the other terminal of the adder 26d through the amplifier 25c. The output signal from the photodetecting cell 24d is also supplied to the other terminal of the adder 26c through the amplifier 25d.

The output signal from the adder 26a is supplied to the inverting input terminal of a differential amplifier OP2. The output signal from the adder 26b is supplied to the noninverting input terminal of the differential amplifier OP2. The differential amplifier OP2 outputs a signal associated with a focal point corresponding to the difference between the output signals from the adders 26a and 26b. This output signal is supplied to a focusing controller 27. The output signal from the focusing controller 27 is supplied to the focusing driving coil 12, so that control is performed to always bring the laser beam to an in-focus position on the optical disk 1.

The output signal from the adder 26c is supplied to the inverting input terminal of a differential amplifier OP1. The output signal from the adder 26d is supplied to the noninverting input terminal of the differential amplifier OP1. The differential amplifier OP1 outputs a track difference signal corresponding to the difference between the output signals from the adders 26c and 26d. This output signal is supplied to a tracking controller 28. The tracking controller 28 generates a track driving signal in accordance with the track difference signal from the differential amplifier OP1.

The track driving signal output from the tracking controller 28 is supplied to the driving coil 11 in the tracking direction. The track difference signal used by the tracking controller 28 is supplied to the linear motor controller 8.

Once focusing control and tracking control are performed in the above manner, a change in reflectance of the beam reflected by a pit formed on a track header of the optical disk 1 is reflected to the sum signal of output signals from the photodetecting cells 24a to 24d of the photodetector 24, i.e., the output signal from an adder 26e as the sum of the output signals from the adders 26c and 26d. This signal is supplied to the data reproduction circuit 18. The data reproduction circuit 18 reproduces recorded data on the basis of the reproduction clock signal from the PLL circuit 16 and a header detection signal supplied from a control circuit 50. This control circuit 50 may be incorporated with the CPU 30.

The data reproduction circuit 18 also detects a sector mark in the preformat data on the basis of the output signal from the adder 26e and the reproduction clock signal from the PLL circuit 16, and simultaneously, reproduces, from a binary signal supplied from the PLL circuit 16, a track number and sector number as address information on the basis of the binary signal and reproduction clock signal.

The reproduced data from the data reproduction circuit 18 is supplied to the error correction circuit 32 through a bus 29. The error correction circuit 32 corrects an error using an error correction code (ECC) in the reproduced data or adds the error correction code (ECC) to recording data supplied from an interface circuit 35 and outputs the data to a memory 2A.

The reproduced data error-corrected by the error correction circuit 32 is supplied to a recording medium control unit 36 as an external unit through the bus 29 and the interface circuit 35. Recording data output from the recording medium control unit 36 is supplied to the error correction circuit 32 through the interface circuit 35 and the bus 29.

When the objective lens 10 is being moved by the tracking controller 28, the linear motor 6, i.e., the optical pickup 5 is moved by the linear motor controller 8 such that the objective lens 10 is positioned near the center of the optical pickup 5.

A D/A converter 31 is used to information exchange between the focusing controller 27, tracking controller 28, and linear motor controller 8, and the CPU 30 for controlling the entire optical disk device.

The motor controller 4, the linear motor controller 8, the laser driving circuit 15, the PLL circuit 16, the data reproduction circuit 18, the focusing controller 27, the tracking controller 28, the error correction circuit 32, and the like are controlled by the CPU 30 through the bus 29. The CPU 30 performs a predetermined operation on the basis of a program recorded on the memory 2A.

A case wherein the preformatted header portion of the information recording/reproducing optical disk 1 according to the present invention is read in recording/reproducing information in/from the optical disk 1 using the optical disk device having the above arrangement will be described below with reference to FIGS. 4A and 4B.

In FIG. 4A, when the header portion to be read is the header portion of the first sector S1, e.g., the header portion HF2 of the groove sector indicated by sector number #(m), the laser beam is irradiated on the recording portion T(n−1)4 of the land sector indicated by sector number #(m−1) prior to reading of the header portion HF2. The laser spot irradiated on the recording portion T(n−1)4 traces the track center of the recording portion T(n−1)4. This laser spot tracing is performed under the tracking control of the optical disk device described above with reference to FIG. 7.

The laser beam irradiated on the recording portion T(n−1)4 of the land sector indicated by sector number #(m−1) while tracing the track center is then irradiated on the header portions HF1 and HF2 recorded on the header region HD1 of the optical disk 1.

As described above, the header portions HF1 and HF2 are constituted by data having a total length of 128 bytes. Assume that data of one byte has a length of about 3 micron on the disk 1. In this case, the header portions HF1 and HF2 have a length of about 400 micron. It is also assumed that the laser beam is irradiated on the disk 1 at a linear speed of about 6 m/s. The laser spot passes the header portions HF1 and HF2 in a time of about 67 microsecond.

Even when the header portions are staggered in such a short time as shown in FIGS. 4A and 4B, the band of the tracking control system is so narrow that the light spot cannot follow the staggered header portions instantaneously. Therefore, it can be considered that the light spot traces a virtual track center. Although this virtual track center is different from the real track centers of each of the header portions HF1 and HF2, data such as address information preformatted on the header portions HF1 and HF2 can be sufficiently read, because at least a half area of the light spot can trace the half area of the header portions HF1 and HF2. After the header portions HF1 and HF2 are read, the laser beam irradiated from the optical pickup passes the mirror portion and then is irradiated on the recording portion Tn1 of the groove sector indicated by sector number #(m) while tracing the track center thereof.

In this case, the recording portion of the sector on which the laser beam is irradiated subsequent to the header portions HF1 and HF2 is the recording portion Tn1 of the groove sector. As described above, the header portion used in the groove sector is the second-half header portion constituted by header-3 and header-4. Of the already read header portions HF1 and HF2, the header portion HF2 corresponds to the second-half header portion. Therefore, the second-half header portion HF2 is used as the header portion of the recording portion Tn1, and the address information of the recording portion Tn1 is indicated by the second-half header portion HF2.

As shown in FIG. 4A, the header portions HF1 and HF2 are formed at track positions displaced outward and inward from the recording portion T(n−1)4 on which the laser beam is irradiated prior to the header portions HF1 and HF2 by ½ the track pitch, respectively. In addition, the header portion HF1 and HF2 are formed at track positions displaced outward and inward from the recording portion Tn1 on which the laser beam is irradiated subsequent to the header portions HF1 and HF2 by ½ the track pitch, respectively. That is, an offset in tracking is generated between the header portions and the recording portions. In this case, the quality of the reproduced signal from the header portion may be different from that of the reproduced signal from the recording portion, so header portion detection becomes difficult as compared to the normal state.

However, as described above with reference to FIGS. 6A and 6B, in the optical disk 1 of the present invention, the VFO portion of header-1 as the start portion of the first-half header portion constituted by header-1 and header-2 is made longer than that of header-2 on which the laser beam is irradiated subsequent to header-1. The VFO portion of header-3 as the start portion of the second-half header portion constituted by header-3 and header-4 is also made longer than that of header-4 on which the laser beam is irradiated subsequent to header-3.

In this case as well, the VFO portions of header-1 and header-3 as the start portions of the first-half header portion HF1 and the second-half header portion HF2 are set to be longer than those of header-2 and header-4 other than the start portions. For this reason, the PLL can be more reliably pulled in by the VFO portion of header-1 of the first-half header portion HF1 and the VFO portion of header-3 of the second-half header portion HF2. Therefore, in the optical disk of the present invention, the header portions HF1 and HF2 can be reliably detected.

On the other hand, when the header portion to be read is, e.g., the header portion HF1 of the land sector indicated by sector number #(m+N) although it is also the header portion of a first sector, the laser beam is irradiated on the recording portion Tn4 of the groove sector indicated by sector number

(m+N−1) prior to reading of the header portion HF1. The laser spot irradiated on the recording portion Tn4 traces the track center of the recording portion Tn4. This laser spot tracing is performed under the tracking control of the optical disk device described above with reference to FIG. 7.

The laser beam irradiated on the recording portion Tn4 of the groove sector indicated by sector number #(m+N−1) while tracing the track center is then irradiated on the header portions HF1 and HF4 recorded on the optical disk 1.

The header portions HF1 and HF4 correspond to the first-half header portion and the second-half header portion, respectively. As described above, the entire header portion constituted by the first-half header portion and the second-half header portion is constituted by data having a length of 128 bytes. Assume that data of one byte has a length of about 3 micron on the disk. In this case, the header portions HF1 and HF4 have a length of about 400 micron. It is also assumed that the laser beam is irradiated on the disk 1 at a linear speed of about 6 m/s. The laser spot passes the header portions HF1 and HF4 in a time of about 67 microseconds.

Even when the header portions are staggered in such a short time as shown in FIGS. 4A and 4B, the band of the tracking control system is so narrow that the light spot cannot trace the tracks correctly. Therefore, it can be considered that the light spot traces a virtual track center. Although this virtual track center is different from the real track center of each of the header portions HF1 and HF4, data such as address information preformatted on the header portions HF1 and HF4 can be sufficiently read. After the header portions HF1 and HF4 are read, the laser beam irradiated from the optical pickup passes the mirror portion and then is irradiated on the recording portion T(n+1)1 of the land sector indicated by sector number #(m+N) while tracing the track center.

In this case, the recording portion of the sector on which the laser beam is irradiated subsequent to the header portions HF1 and HF4 is the recording portion T(n+1)1 of the land sector. As described above, the header portion used in the land sector is the first-half header portion constituted by header-1 and header-2. Of the already read header portions HF1 and HF4, the header portion HF1 corresponds to the first-half header portion. Therefore, the first-half header portion HF1 is used as the header portion of the recording portion T(n+1)1, and the address information of the recording portion T(n+1)1 is indicated by the first-half header portion HF1.

As shown in FIG. 4A, the header portions HF1 and HF4 are formed at track positions displaced inward and outward from the recording portion Tn4 on which the laser beam is irradiated prior to the header portions HF1 and HF4 by ½ the track pitch, respectively. In addition, the header portion HF1 and HF4 are formed at track positions displaced outward and inward from the recording portion T(n+1)1 on which the laser beam is irradiated subsequent to the header portions HF1 and HF4 by ½ the track pitch, respectively. That is, an offset in tracking is generated between the header portions and the recording portions. In this case, the quality of the reproduced signal from the header portion may be different from that of the reproduced signal from the recording portion, so header portion detection becomes difficult as compared to the normal state.

However, as described above with reference to FIGS. 6A and 6B, in the optical disk of the present invention, the VFO portion of header-1 as the start portion of the first-half header portion constituted by header-1 and header-2 is made longer than that of header-2 on which the laser beam is irradiated subsequent to header-1. The VFO portion of header-3 as the start portion of the second-half header portion constituted by header-3 and header-4 is also made longer than that of header-4 on which the laser beam is irradiated subsequent to header-3.

In this case as well, the VFO portions of header-1 and header-3 as the start portions of the first-half header portion HF1 and the second-half header portion HF4 are set to be longer than those of header-2 and header-4 other than the start portions. For this reason, the PLL can be more reliably pulled in by the VFO portion of header-1 of the first-half header portion HF1 and the VFO portion of header-3 of the second-half header portion HF4. Therefore, in the optical disk of the present invention, the header portions HF1 and HF4 can be reliably detected.

In reading the header portions HF1 and HF4, the recording portion Tn4 having a one-track difference from the header portions HF1 and HF4 is read prior to the header portions HF1 and HF4. The recording portion T(n+1)1 having a one-track difference from the header portions HF1 and HF4 is read subsequent to the header portions HF1 and HF4. If a difference is generated between the disk rotation period and the recording signal period for N sectors in cutting, the header portions HF1 and HF4 are cut while being shifted from the recording portions Tn4 and T(n+1)1, so header portion detection becomes difficult as compared to the normal state.

However, in this case as well, the VFO portions of header-1 and header-3 as the start portions of the first-half header portion HF1 and the second-half header portion HF4 are set to be longer than those of header-2 and header-4 other than the start portions. For this reason, the PLL can be more reliably pulled in by the VFO portion of header-1 of the first-half header portion HF1 and the VFO portion of header-3 of the second-half header portion HF4. Therefore, in the optical disk of the present invention, the header portions HF1 and HF4 can be reliably detected.

A case wherein the header portion to be read is the header portion of a sector other than the first sector will be described below with reference to FIG. 4B. For example, the header portion H2 of the groove sector indicated by sector number #(n), the laser beam is irradiated on the recording portion Tn1 of the groove sector indicated by sector number #(n−1) prior to reading of the header portion H2. The laser spot irradiated on the recording portion Tn1 traces the track center of the recording portion Tn1. This laser spot tracing is performed under tracking control of the optical disk device described above with reference to FIG. 7.

The laser beam irradiated on the recording portion Tn1 of the groove sector indicated by sector number #(n−1) while tracing the track center is then irradiated on the header portions H1 and H2 recorded on the optical disk 1.

As described above, the header portions H1 and H2 are constituted by data having a total length of 128 bytes. Assume that data of one byte has a length of about 3 micron on the disk 1. In this case, the header portions H1 and H2 have a length of about 400 micron. It is also assumed that the laser beam is irradiated on the disk 1 at a linear speed of about 6 m/s. The laser spot passes the header portions H1 and H2 in a time of about 67 microseconds.

Even when the header portions are staggered in such a short time as shown in FIGS. 4A and 4B, the band of the tracking control system is so narrow that the light spot cannot trace the tracks. Therefore, it can be considered that the light spot traces a virtual track center. Although this virtual track center is different from the normal track center of each of the header portions H1 and H2, data such as address information preformatted on the header portions H1 and H2 can be sufficiently read. After the header portions H1 and H2 are read, the laser beam irradiated from the optical pickup passes the mirror portion and then is irradiated on the recording portion Tn2 of the groove sector indicated by sector number #(n) while tracing the track center.

In this case, the recording portion of the sector on which the laser beam is irradiated subsequent to the header portions H1 and H2 is the recording portion Tn2 of the groove sector. As described above, the header portion used in the groove sector is the second-half header portion constituted by header-3 and header-4. Of the already read header portions H1 and H2, the header portion H2 corresponds to the second-half header portion. Therefore, the second-half header portion H2 is used as the header portion of the recording portion Tn2, and the address information of the recording portion Tn2 is indicated by the second-half header portion H2.

As shown in FIG. 4B, the header portions H1 and H2 are formed at track positions displaced outward and inward from the recording portion Tn1 on which the laser beam is irradiated prior to the header portions H1 and H2 by ½ the track pitch, respectively. In addition, the header portion H1 and H2 are formed at track positions displaced outward and inward from the recording portion Tn2 on which the laser beam is irradiated subsequent to the header portions H1 and H2 by ½ the track pitch, respectively. That is, an offset in tracking is generated between the header portions and the recording portions. In this case, the quality of the reproduced signal from the header portion may be different from that of the reproduced signal from the recording portion, so header portion detection becomes difficult as compared to the normal state.

However, as described above with reference to FIGS. 6A and 6B, in the optical disk 1 of the present invention, the VFO portion of header-1 as the start portion of the first-half header portion constituted by header-1 and header-2 is made longer than that of header-2 on which the laser beam is irradiated subsequent to header-1. The VFO portion of header-3 as the start portion of the second-half header portion constituted by header-3 and header-4 is also made longer than that of header-4 on which the laser beam is irradiated subsequent to header-3.

In this case as well, the VFO portions of header-1 and header-3 as the start portions of the first-half header portion H1 and the second-half header portion H2 are set to be longer than those of header-2 and header-4 other than the start portions. For this reason, the PLL can be more reliably pulled in by the VFO portion of header-1 of the first-half header portion H1 and the VFO portion of header-3 of the second-half header portion H2. Therefore, in the optical disk of the present invention, the header portions H1 and H2 can be reliably detected.

On the other hand, when the header portion to be read is, e.g., the header portion H1 of not the groove sector but the land sector indicated by sector number #(n+N) although it is also the header portion of a first sector, the laser beam is irradiated on the recording portion T(n+1)1 of the land sector indicated by sector number #(n+N−1) prior to reading of the header portion H1. The laser spot irradiated on the recording portion T(n+1)1 traces the track center of the recording portion T(n+1)1. This laser spot tracing is performed under the tracking control of the optical disk device described above with reference to FIG. 7.

The laser beam irradiated on the recording portion T(n+1)1 of the land sector indicated by sector number #(n+N−1) while tracing the track center is then irradiated on the header portions H1 and H4 recorded on the optical disk 1.

The header portions H1 and H4 correspond to the first-half header portion and the second-half header portion, respectively. As described above, the entire header portion constituted by the first-half header portion and the second-half header portion is constituted by data having a length of 128 bytes. Assume that data of one byte has a length of about 3 micron on the disk 1. In this case, the header portions H1 and H4 have a length of about 400 micron. It is also assumed that the laser beam is irradiated on the disk 1 at a linear speed of about 6 m/s. The laser spot passes the header portions H1 and H4 in a time of about 67 microseconds.

Even when the header portions are staggered in such a short time as shown in FIGS. 4A and 4B, the band of the tracking control system is so narrow that the light spot cannot trace the tracks correctly. Therefore, it can be considered that the light spot traces a virtual track center. Although this virtual track center is different from the real track center of each of the header portions H1 and H4, data such as address information preformatted on the header portions H1 and H4 can be sufficiently read. After the header portions H1 and H4 are read, the laser beam irradiated from the optical pickup passes the mirror portion and then is irradiated on the recording portion T(n+1)2 of the land sector indicated by sector number #(n+N) while tracing the track center.

In this case, the recording portion of the sector on which the laser beam is irradiated subsequent to the header portions H1 and H4 is the recording portion T(n+1)2 of the land sector. As described above, the header portion used in the land sector is the first-half header portion constituted by header-1 and header-2. Of the already read header portions H1 and H4, the header portion H1 corresponds to the first-half header portion. Therefore, the first-half header portion H1 is used as the header portion of the recording portion T(n+1)2, and the address information of the recording portion T(n+1)2 is indicated by the first-half header portion H1.

As shown in FIG. 4B, the header portions H1 and H4 are formed at track positions displaced inward and outward from the recording portion T(n+1)1 on which the laser beam is irradiated prior to the header portions H1 and H4 by ½ the track pitch, respectively. In addition, the header portions H1 and H4 are formed at track positions displaced outward and inward from the recording portion T(n+1)2 on which the laser beam is irradiated subsequent to the header portions H1 and H4 by ½ the track pitch, respectively. That is, an offset in tracking is generated between the header portions and the recording portions. In this case, the quality of the reproduced signal from the header portion may be different from that of the reproduced signal from the recording portion, so header portion detection becomes difficult as compared to the normal state.

However, as described above with reference to FIGS. 6A and 6B, in the optical disk 1 of the present invention, the VFO portion of header-1 as the start portion of the first-half header portion constituted by header-1 and header-2 is made longer than that of header-2 on which the laser beam is irradiated subsequent to header-1. The VFO portion of header-3 as the start portion of the second-half header portion constituted by header-3 and header-4 is also made longer than that of header-4 on which the laser beam is irradiated subsequent to header-3.

In this case as well, the VFO portions of header-1 and header-3 as the start portions of the first-half header portion H1 and the second-half header portion H4 are set to be longer than those of header-2 and header-4 other than the start portions. For this reason, the PLL can be more reliably pulled in by the VFO portion of header-1 of the first-half header portion H1 and the VFO portion of header-3 of the second-half header portion H4. Therefore, in the optical disk 1 of the present invention, the header portions H1 and H4 can be reliably detected.

In reading the header portions H1 and H4, the recording portion T(n+1)1 having a one spiraltrack difference from the header portions H1 and H4 is read prior to the header portions H1 and H4. The recording portion T(n+1)2 having a one spiral track difference from the header portions H1 and H4 is read subsequent to the header portions H1 and H4. If a difference is generated between the disk rotation period and the recording signal period for N sectors in cutting, the header portions H1 and H4 are cut while being shifted from the recording portions T(n+1)1 and T(n+1)2, so header portion detection becomes difficult as compared to the normal state.

However, in this case as well, the VFO portions of header-1 and header-3 as the start portions of the first-half header portion H1 and the second-half header portion H4 are set to be longer than those of header-2 and header-4 other than the start portions. For this reason, the PLL can be more reliably pulled in by the VFO portion of header-1 of the first-half header portion H1 and the VFO portion of header-3 of the second-half header portion H4. Therefore, in the optical disk of the present invention, the header portions H1 and H4 can be reliably detected.

As has been described above, the information recording/reproducing optical disk according to the present invention has recording portions alternated between the land and groove in units of spiral tracks and staggered header portions preformatted to have a long PLL pull-in area. With this arrangement, the optical disk has a large recording capacity and allows continuous information recording/reproduction with high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording/reproducing optical disk comprising:
   a predetermined number of land sectors arranged along one spiral track each land sector having,
      a first recording portion as a land-shaped area arranged on the spiral track to record/reproduce information, and
      a first-half header portion comprising a first header portion representing address information of the information to be recorded/reproduced on/from said first recording portion and having a start portion as a continuously repeated data pattern with a first length, and a second header portion arranged subsequent to said first header portion, representing the same address information as that represented by said first header portion, and having a start portion as a continuously repeated data pattern with a second length smaller than the first length, and arranged prior to said first recording portion; and
   a predetermined number of groove sectors arranged along one spiral track subsequent to said predetermined number of land sectors, each groove sector having,
      a second recording portion as a groove-shaped area arranged on the spiral track to record/reproduce information, and
      a second-half header portion comprising a third header portion representing address information of the information to be recorded/reproduced on/from said second recording portion and having a start portion as a continuously repeated data pattern with a third length, and a fourth header portion arranged subsequent to said third header portion, representing the same address information as that represented by said third header portion, and having a start portion as a continuously repeated data pattern with a fourth length smaller than the third length, and arranged prior to said first recording portion while being paired and staggered with said first-half header portion,
   wherein said predetermined number of land sectors are arranged subsequent to said predetermined number of groove sectors so that said land sectors and said groove sectors are continuously alternated in units of spiral tracks; and
   wherein the data pattern of each of said first and third header portions has a length of 36 bytes, and the data pattern of each of said second and fourth header portions has a length of 8 bytes.

2. An information recording/reproducing optical disk comprising:
   a predetermined number of land sectors arranged alone one spiral track, each land sector having.
      a first recording portion as a land-shaped area arranged on the spiral track to record/reproduce information, and
      a first-half header portion comprising a first header portion representing address information of the information to be recorded/reproduced on/from said first recording portion and having a start portion as a continuously repeated data pattern with a first length, and a second header portion arranged subsequent to said first header portion at the same track position as that of said first header portion, representing the same address information as that represented by said first header portion, and having a start portion as a continuously repeated data pattern with a second length smaller than the first length, and arranged prior to said first recording portion at a track position displaced from a track position of said first recording portion in a radial direction of said optical disk by the first length; and
   a predetermined number of groove sectors arranged along one spiral track subsequent to said predetermined number of land sectors, each groove sector having,
      a second recording portion as a groove-shaped area arranged on the spiral track to record/reproduce information, and
      a second-half header portion comprising a third header portion representing address information of the information to be recorded/reproduced on/from said second recording portion and having a start portion as a continuously repeated data pattern with a third length, and a fourth header portion arranged subsequent to said third header portion at the same track position as that of said third header portion, representing the same address information as that represented by said third header portion, and having a start portion as a continuously repeated data pattern with a fourth length smaller than the third length, and arranged prior to said first recording portion at a track position displaced from a track position of said second recording portion in the radial direction of said optical disk by the second length while being paired and staggered with said first-half header portion, wherein said predetermined number of land sectors are arranged subsequent to said predetermined number of groove sectors so that said land sectors and said groove sectors are continuously alternated in units of spiral tracks, and wherein the data pattern of each of said first and third header portions has a length of 36 bytes, and the data pattern of each of said second and fourth header portions has a length of 8 bytes.

3. An information recording/reproducing optical disk comprising:

a predetermined number of land sectors arranged along one spiral track, each land sector having,
- a first recording portion as a land-shaped area arranged on the spiral track to record/reproduce information, and
- a first-half header portion comprising a first header portion representing address information of the information to be recorded/reproduced on/from said first recording portion and having a start portion as a continuously repeated data pattern with a first length, and a second header portion arranged subsequent to said first header portion at the same track position as that of said first header portion, representing the same address information as that represented by said first header portion, and having a start portion as a continuously repeated data pattern with a second length smaller than the first length, and arranged prior to said first recording portion at a track position displaced from a track position of said first recording portion outward in a radial direction of said optical disk by a distance ½ a track pitch of the spiral track; and a predetermined number of groove sectors arranged along one spiral track subsequent to said predetermined number of land sectors, each groove sector having,
- a second recording portion as a groove-shaped area arranged on the spiral track to record/reproduce information, and
- a second-half header portion comprising a third header portion representing address information of the information to be recorded/reproduced on/from said second recording portion and having a start portion as a continuously repeated data pattern with a third length, and a fourth header portion arranged subsequent to said third header portion at the same track position as that of said third header portion, representing the same address information as that represented by said third header portion, and having a start portion as a continuously repeated data pattern with a fourth length smaller than the third length, and arranged prior to said first recording portion at a track position displaced from a track position of said second recording portion inward in the radial direction of said optical disk by the distance ½ the track pitch of the spiral track while being paired and staggered with said first-half header portion, wherein said predetermined number of land sectors are arranged subsequent to said predetermined number of groove sectors arranged so that said land sectors and said groove sectors are continuously alternated in units of spiral tracks, and wherein the data pattern of each of said first and third header portions has a length of 36 bytes, and the data pattern of each of said second and fourth header portions has a length of 8 bytes.

4. A method of forming an information recording/reproducing optical disk, the optical disk including, a predetermined number of land sectors arranged along one spiral track, each land sector having,
- a first recording portion as a land-shaped area arranged on the spiral track to record/reproduce information, and
- a first-half header portion comprising a first header portion representing address information of the information to be recorded/reproduced on/from said first recording portion and having a start portion as a continuously repeated data pattern with a first length, and a second header portion arranged subsequent to said first header portion, representing the same address information as that represented by said first header portion, and having a start portion as a continuously repeated data pattern with a second length smaller than the first length, and arranged prior to said first recording portion; and a predetermined number of groove sectors arranged along one spiral track subsequent to said predetermined number of land sectors arranged along the spiral track, each groove sector having,
- a second recording portion as a groove-shaped area arranged on the spiral track to record/reproduce information, and
- a second-half header portion comprising a third header portion representing address information of the information to be recorded/reproduced on/from said second recording portion and having a start portion as a continuously repeated data pattern with a third length, and a fourth header portion arranged subsequent to said third header portion, representing the same address information as that represented by said third header portion, and having a start portion as a continuously repeated data pattern with a fourth length smaller than the third length, and arranged prior to said first recording portion while being paired and staggered with said first-half header portion, and said predetermined number of land sectors being arranged subsequent to said predetermined number of groove sectors so that said land sectors and said groove sectors are continuously alternated in units of spiral tracks, said method comprising:

forming only a predetermined number of first recording portions of said land sectors continuously along one spiral track without forming said first-half header portions of said land sectors;

after only said predetermined number of first recording portions are continuously formed along the spiral track, forming a predetermined number of second recording portions of said groove sectors continuously along one spiral track while simultaneously forming said second-half header portions of said groove sectors and said first-half header portions of said land sectors, which represent address information with a one-track difference from that represented by said second-half header portions, so that said first-half header portions, said second-half header portions, and said second recording portions are continuously formed along one spiral track; and after said predetermined number of second recording portions are formed alone one spiral track together with said first-half header portions and said second-half header portions, forming only a predetermined number of first recording portions continuously alone one spiral track without forming said first-half header portions of said land sectors so that said land sectors and said groove sectors are alternated in units of spiral tracks;

wherein the data pattern of each of said first to fourth header portions is used to cause an optical disk device for recording/reproducing information in/from said optical disk to generate a synchronous signal to be synchronized with the information to be reproduced from said optical disk; and wherein the data pattern of each of said first and third header portions has a length of 36 bytes, and the data pattern of each of said second and fourth header portions has a length of 8 bytes.

5. A method of forming an information recording/reproducing optical disk, the optical disk including, a predetermined number of land sectors arranged alone one spiral track, each land sector having,
  a first recording portion as a land-shaped area arranged on the spiral track to record/reproduce information, and
  a first-half header portion comprising a first header portion representing address information of the information to be recorded/reproduced on/from said first recording portion and having a start portion as a continuously repeated data pattern with a first length, and a second header portion arranged subsequent to said first header portion at the same track position as that of said first header portion, representing the same address information as that represented by said first header portion, and having a start portion as a continuously repeated data pattern with a second length smaller than the first length, and arranged prior to said first recording portion at a track position displaced from a track position of said first recording portion in a radial direction of said optical disk by the first length; and a predetermined number of groove sectors arranged along one spiral track subsequent to said predetermined number of land sectors arranged along the spiral track, each groove sector having,
  a second recording portion as a groove-shaped area arranged on the spiral track to record/reproduce information, and
  a second-half header portion comprising a third header portion representing address information of the information to be recorded/reproduced on/from said second recording portion and having a start portion as a continuously repeated data pattern with a third length, and a fourth header portion arranged subsequent to said third header portion at the same track position as that of said third header portion, representing the same address information as that represented by said third header portion, and having a start portion as a continuously repeated data pattern with a fourth length smaller than the third length, and arranged prior to said first recording portion at a track position displaced from a track position of said second recording portion in the radial direction of said optical disk by the second length while being paired and staggered with said first-half header portion, and said predetermined number of land sectors being arranged subsequent to said predetermined number of groove sectors so that said land sectors and said groove sectors are continuously alternated in units of spiral tracks, said method comprising:
  forming only a predetermined number of first recording portions of said land sectors continuously along one spiral track without forming said first-half header portions of said land sectors;

after only said predetermined number of first recording portions are continuously formed along the spiral track, forming a predetermined number of second recording portions of said groove sectors continuously along one spiral track while simultaneously forming said second-half header portions of said groove sectors and said first-half header portions of said land sectors, which represent address information with a one-track difference from that represented by said second-half header portions, so that said first-half header portions, said second-half header portions, and said second recording portions are continuously formed along one spiral track; and after said predetermined number of second recording portions are formed along one spiral track together with said first-half header portions and said second-half header portions, forming only a predetermined number of first recording portions continuously along one spiral track without forming said first-half header portions of said land sectors so that said land sectors and said groove sectors are alternated in units of spiral tracks;

wherein the data pattern of each of said first to fourth header portions is used to cause an optical disk device for recording/reproducing information in/from said optical disk to generate a synchronous signal to be synchronized with the information to be reproduced from said optical disk; and wherein the data pattern of each of said first and third header portions has a length of 36 bytes, and the data pattern of each of said second and fourth header portions has a length of 8 bytes.

6. A method of forming an information recording/reproducing optical disk, the optical disk including, a predetermined number of land sectors arranged along one spiral track, each land sector having,
  a first recording portion as a land-shaped area arranged on the spiral track to record/reproduce information, and
  a first-half header portion comprising a first header portion representing address information of the information to be recorded/reproduced on/from said first recording portion and having a start portion as a continuously repeated data pattern with a first length, and a second header portion arranged subsequent to said first header portion at the same track position as that of said first header portion, representing the same address information as that represented by said first header portion, and having a start portion as a continuously repeated data pattern with a second length smaller than the first length, and arranged prior to said first recording portion at a track position displaced from a track position of said first recording portion inward in a radial direction of said optical disk by a distance ½ a track pitch of the spiral track; and a predetermined number of groove sectors arranged along one spiral track subsequent to said predetermined number of land sectors arranged alone the spiral track, each groove sector having
- a second recording portion as a groove-shaped area arranged on the spiral track to record/reproduce information, and
- a second-half header portion comprising a third header portion representing address information of the information to be recorded/reproduced on/from said second recording portion and having a start portion as a continuously repeated data pattern with a third length, and a fourth header portion arranged subsequent to said third header portion at the same track position as that of said third header portion, representing the same address information as that represented by said third header portion, and having a start portion as a continuously repeated data pattern with a fourth length smaller than the third length, and arranged prior to said first recording portion at a track position displaced from a track position of said second recording portion inward in the radial direction of said optical disk by the distance ½ the track pitch of the spiral track while being paired and staggered with said first-half header portion, and said predetermined number of land sectors arranged subsequent to said predetermined number of groove sectors so that said land sectors and said groove sectors are continuously alternated in units of spiral tracks, said method comprising:

- forming only a predetermined number of first recording portions of said land sectors continuously along one spiral track without forming said first-half header portions of said land sectors;
- after only said predetermined number of first recording portions are continuously formed along the spiral track, forming a predetermined number of second recording portions of said groove sectors continuously along one spiral track while simultaneously forming said second-half header portions of said groove sectors and said first-half header portions of said land sectors, which represent address information with a one-track difference outward from that represented by said second-half header portions, so that said first-half header portions, said second-half header portions, and said second recording portions are continuously formed alone one spiral track; and
- after said predetermined number of second recording portions are formed along one spiral track together with said first-half header portions and said second-half header portions, forming only a predetermined number of first recording portions continuously along one spiral track without forming said first-half header portions of said land sectors so that said land sectors and said groove sectors are alternated in units of spiral tracks;
- wherein the data pattern of each of said first to fourth header portions is used to cause an optical disk device for recording/reproducing information in/from said optical disk to generate a synchronous signal to be synchronized with the information to be reproduced from said optical disk; and
- wherein the data pattern of each of said first and third header portions has a length of 36 bytes, and the data pattern of each of said second and fourth header portions has a length of 8 bytes.

* * * * *